US012781113B2

(12) United States Patent
Wang et al.

(10) Patent No.: US 12,781,113 B2
(45) Date of Patent: Nov. 3, 2026

(54) TYPE OF TRIPLE NETWORK COOLING HYDROGEL WITH HIGH COMPRESSIVE AND ELASTIC

(71) Applicant: PIP Manufacturing, Inc., Latham, NY (US)

(72) Inventors: Yuyan Wang, Latham, NY (US); Tianqi Zhou, Latham, NY (US); Zhixiong Hou, Latham, NY (US); Rui Luo, Latham, NY (US); Ling Lin, Latham, NY (US); Zheng Gu, Latham, NY (US); Peng Zhou, Latham, NY (US); Le Liu, Latham, NY (US); Qingyi Zhao, Latham, NY (US); Marc Dudelzak, Latham, NY (US)

(73) Assignee: PIP Manufacturing, Inc., Latham, NY (US)

( * ) Notice: Subject to any disclaimer, the term of this patent is extended or adjusted under 35 U.S.C. 154(b) by 528 days.

(21) Appl. No.: 18/350,808

(22) Filed: Jul. 12, 2023

(65) Prior Publication Data

US 2024/0043729 A1 Feb. 8, 2024

(30) Foreign Application Priority Data

Aug. 2, 2022 (CN) ........................ 202210921230.6

(51) Int. Cl.

| | |
|---|---|
| ***C09K 5/06*** | (2006.01) |
| ***B01J 13/00*** | (2006.01) |
| ***B01J 13/20*** | (2006.01) |
| ***C08J 3/075*** | (2006.01) |

(Continued)

(52) U.S. Cl.

CPC ........... *C09K 5/063* (2013.01); *B01J 13/0065* (2013.01); *B01J 13/20* (2013.01); *C08J 3/075* (2013.01); *C08J 3/243* (2013.01); *C08L 29/04* (2013.01); *C08J 2329/04* (2013.01); *C08J 2383/04* (2013.01)

(58) Field of Classification Search

CPC ....... C09K 5/063; B01J 13/0065; B01J 13/20; C08J 3/075; C08J 3/243; C08J 2329/04; C08J 2383/04; C08J 3/246; C08L 29/04; C08L 2205/22; C08K 5/07; C08K 9/10; C08K 5/01; C08K 5/13

See application file for complete search history.

(56) References Cited

FOREIGN PATENT DOCUMENTS

| | | |
|---|---|---|
| CN | 101455856 B | 7/2012 |
| CN | 110016149 A | 7/2019 |
| CN | 110746939 B | 7/2020 |

(Continued)

OTHER PUBLICATIONS

Perween et al, PVA-PDMS-Stearic acid composite nanofibrous mats with improved mechanical behavior for selective filtering applications, Oct. 30, 2018, www.Nature.com/scientificreports (Year: 2018).*

(Continued)

*Primary Examiner* — Cephia D Toomer

(74) *Attorney, Agent, or Firm* — Fredrikson & Byron, P.A.

(57) ABSTRACT

The invention provides triple crosslinked cooling hydrogel compositions of high tensile strength, high compressibility, high elasticity, and long cooling period and methods of making the compositions. The compositions are useful in clothing and equipment for wear in high solar radiation environments and high temperature environments.

21 Claims, 13 Drawing Sheets

(51) Int. Cl.
*C08J 3/24* (2006.01)
*C08L 29/04* (2006.01)

(56) References Cited

FOREIGN PATENT DOCUMENTS

| | | |
|---|---|---|
| CN | 113174237 A | 7/2021 |
| CN | 109880127 B | 2/2022 |

OTHER PUBLICATIONS

Elidiane Carvalho Coelho et al., "Poly(vinyl alcohol) and poly(dimethylsiloxane)-based interpenetrating polymer networks via radical polymerisation," Journal of Polymer Research, 21(561):1-11, (Aug. 26, 2014).
Extended European Search Report Mailed on Dec. 7, 2023 for EP Application No. 23183680, 9 page(s).
Honeywell Miller, "Honeywell Miller H700 Series," Miller H700 Brochure, 1-10, (Sep. 2021).
Jing-Hui Wang et al., "High-strength and tough composite hydrogels reinforced by the synergistic effect of nano-doping and triple-network structures," European Polymer Journal, 142(110122):1-9, (Nov. 7, 2020).
Kunyang Yu et al., "Review on form-stable inorganic hydrated salt phase change materials: Preparation, characterization and effect on the thermophysical properties," Applied Energy, 292(116845):1-28, (Apr. 2, 2021).
M. Morales-Hurtado et al., "A new water absorbable mechanical Epidermal skin equivalent: The combination of hydrophobic PDMS and hydrophilic PVA hydrogel," Journal of the Mechanical Behavior of Biomedical Materials, 46:305-317, (2015).
Xiao-Dong Jiao et al., "Preparation of Hydrogel Paraffin Microcapsules and Its Effect on the Shrinkage of Cement Mortars," Ceramics-Silikaty, 65(4):354-362, (2021). [Retrieved from the Internet Jan. 23, 2024: URL: <https://www.researchgate.net/publication/355048318_PREPARATION_OF_HYDROGEL_PARAFFIN_MICROCAPSULES_AND_ITS_EFFECT_ON_THE_SHRINKAGE_OF_CEMENT_MORTARS>].
EP Office Action Mailed on Oct. 31, 2024 for EP Application No. 23183680, 3 page(s).

* cited by examiner

| | TEST IMAGES | TEST GRAPH | MAXIMUM LOAD (N) | EXTENSION AT MAXIMUM LOAD (mm) |
|---|---|---|---|---|
| TN (TRIPLE NETWORK) HYDROGEL |  |  | 33.73N | 129mm |
| NORMAL HYDROGEL |  |  | 5.62N | 5.02mm |

| | TEST IMAGES | TEST GRAPH | LOAD(N) AT EXTENSION AT 17mm | SHAPE STABLE |
|---|---|---|---|---|
| TN (TRIPLE NETWORK) HYDROGEL |  |  | 2850N | BEFORE: 8.3cm <br>AFTER: 8.3cm  |
| NORMAL HYDROGEL |  |  | 285N | BEFORE: 8.0cm <br>AFTER: 13.0cm  |

TYPE OF TRIPLE NETWORK COOLING HYDROGEL WITH HIGH COMPRESSIVE AND ELASTIC

CROSS-REFERENCE TO RELATED APPLICATIONS

This application claims priority pursuant to 35 U.S.C. 119(a) to Chinese Application No. 202210921230.6, filed Aug. 2, 2022, which application is incorporated herein by reference in its entirety.

TECHNICAL FIELD

The invention provides triple network cooling hydrogel compositions of high tensile strength, high compression, high elasticity, and long cooling period and methods of making the compositions.

BACKGROUND OF THE INVENTION

Hydrogels are a class of hydrated polymeric materials with a three-dimensional network structure. Hydrogels reported in the art include polyvinyl alcohol (PVA) hydrogels (CN110016149A) and polydimethylsiloxane (PDMS)/PVA hydrogel composites (CN110016149A). Phase change materials (PCMs), as an energy storage technology, can store large amounts of energy in the form of latent heat during the phase change process. Reported in the art are composite materials of a PCM and PVA hydrogel (CN110746939B; CN101455856B) and of a paraffin wax PCM and a calcium alginate hydrogel (Jiao, X. D., et al. Ceramics—Silikaty 65 (4) 354-363 (2021). There is a need in the art for hydrogels with improved properties.

BRIEF SUMMARY OF THE CLAIMED INVENTION

In one aspect, the invention provides a triple crosslinked cooling hydrogel composition comprising about 4-8% w/w polyvinyl alcohol (PVA), about 4-8% w/w polydimethylsiloxane (PDMS), about 15-25% w/w phase change material (PCM), about 55-68% w/w water, and about 0.5-2.5% w/w crosslinker. In some triple crosslinked cooling hydrogel compositions, the PVA is PVA 1799. In some triple crosslinked cooling hydrogel compositions, the crosslinker is glutaraldehyde.

In some triple crosslinked cooling hydrogel compositions, the PCM is/comprises at least one of PCM 28, PCM 32, PCM 37, PCM 42, PCM 45, and PCM 52. In some triple crosslinked cooling hydrogel compositions, the PCM comprises at least two of PCM 28, PCM 32, PCM 37, PCM 42, PCM 45, and PCM 52. In some triple crosslinked cooling hydrogel compositions, the PCM comprises at least three of PCM 28, PCM 32, PCM 37, PCM 42, PCM 45, and PCM 52. In some triple crosslinked cooling hydrogel compositions, the PCM comprises at least four of PCM 28, PCM 32, PCM 37, PCM 42, PCM 45, and PCM 52. In some triple crosslinked cooling hydrogel compositions, the PCM comprises at least five of PCM 28, PCM 32, PCM 37, PCM 42, PCM 45, and PCM 52. In some triple crosslinked cooling hydrogel compositions, the PCM comprises PCM 28, PCM 32, PCM 37, PCM 42, PCM 45, and PCM 52. Some triple crosslinked cooling hydrogel compositions further comprise vanillic acid.

Some triple crosslinked cooling hydrogel compositions comprise about 6.1% PVA 1799, about 57% w/w water, about 22% w/w PCM, about 5.4% w/w PDMS, about 0.87% w/w glutaraldehyde, and about 0.89% w/w vanillic acid. In some triple crosslinked cooling hydrogel compositions the PCM comprises PCM 28, PCM 32, PCM 37, PCM 42, PCM 45, and PCM 52.

Some triple crosslinked cooling hydrogel compositions comprise about 6.4% w/w PVA 1799, about 58% w/w water, about 21% w/w PCM, about 5.8% w/w PDMS, about 0.99% w/w glutaraldehyde, and about 0.68% w/w vanillic acid. In some triple crosslinked cooling hydrogel compositions, the PCM comprises PCM 28 and PCM 32.

Some triple crosslinked cooling hydrogel compositions comprise about 4.8% w/w PVA 1799, about 63% w/w water, about 19% w/w PCM, about 5.3% w/w PDMS, about 0.72% w/w glutaraldehyde, and about 0.85% w/w vanillic acid. In some triple crosslinked cooling hydrogel compositions, the PCM comprises PCM 28, PCM 32, PCM 42, and PCM 52.

Some triple crosslinked cooling hydrogel compositions comprise about 6.4% w/w PVA 1799, about 59% w/w water, about 19% w/w PCM, about 5.6% w/w PDMS, about 0.91% w/w glutaraldehyde, and about 0.92% w/w vanillic acid. In some triple crosslinked cooling hydrogel compositions, the PCM comprises PCM 28, PCM 32, PCM 37, PCM 42, and PCM 52.

Some triple crosslinked cooling hydrogel compositions comprise about 6.2% w/w PVA 1799, about 57% w/w water, about 22% w/w PCM, about 5.5% w/w PDMS, and about 2.1% w/w glutaraldehyde. In some triple crosslinked cooling hydrogel compositions, the PCM comprises PCM 28, PCM 32, PCM 37, PCM 42, PCM 45, and PCM 52.

Some triple crosslinked cooling hydrogel compositions comprise about 6.7% w/w PVA 1799, about 64% w/w water, about 18% w/w PCM, about 4.9% w/w PDMS, and about 1.7% w/w glutaraldehyde. In some triple crosslinked cooling hydrogel compositions, the PCM comprises PCM 32 and PCM 37.

In another aspect, the invention provides a method for making any of the triple crosslinked cooling hydrogels disclosed herein, comprising (a) adding PVA to water at about 95° C. and performing stifling to produce a first crosslinked single network PVA hydrogel; (b) adding PDMS and a first curing agent to the first crosslinked single network PVA hydrogel at about 30° C. and performing stirring, to produce a double network PVA+PDMS hydrogel; (c) increasing the temperature of the double network PVA+PDMS hydrogel to about 95° C. at the rate of about 2° C./minute and performing stirring to produce a double network PVA+solidified PDMS hydrogel; (d) decreasing the temperature of the double network PVA+solidified PDMS hydrogel to about 85° C. and adding PCM performing stirring to produce a triple network PVA+PDMS+PCM hydrogel; (e) adding a crosslinking agent to the triple network PVA+PDMS+PCM hydrogel at about 85° C. to produce a stable triple network PVA+PDMS+PCM hydrogel; and (f) cooling the stable triple network PVA+PDMS+PCM hydrogel to room temperature to produce the triple network cooling hydrogel.

In some methods, the PCM is a PCM particle emulsion prepared by mixing PCM microcapsules and water. Some methods further comprise adding a second curing agent to the triple network PVA+PDMS+PCM hydrogel in step (e). In some methods, the second curing agent is vanillic acid. In some methods, the PVA is PVA 1799. In some methods, the first curing agent is pre-mixed with the PDMS. In some methods, the crosslinking agent is glutaraldehyde.

In some methods, the PCM is/comprises at least one of PCM 28, PCM 32, PCM 37, PCM 42, PCM 45, and PCM 52. In some methods, the PCM comprises at least two of PCM 28, PCM 32, PCM 37, PCM 42, PCM 45, and PCM 52. In some methods, the PCM comprises at least three of PCM 28, PCM 32, PCM 37, PCM 42, PCM 45, and PCM 52. In some methods, the PCM comprises at least four of PCM 28, PCM 32, PCM 37, PCM 42, PCM 45, and PCM 52. In some methods, the PCM comprises at least five of PCM 28, PCM 32, PCM 37, PCM 42, PCM 45, and PCM 52. In some methods, the PCM comprises PCM 28, PCM 32, PCM 37, PCM 42, PCM 45, and PCM 52.

In another aspect, the invention provides an article of clothing comprising any of the triple network cooling hydrogels disclosed herein. For example, the article of clothing can be a safety harness. The safety harness can comprise a padding. The padding can comprise any of the triple network cooling hydrogels disclosed herein.

BRIEF DESCRIPTION OF THE DRAWINGS

In FIG. 5A, representative PCM particles are marked as 2-3 μm particles and representative PDMS particles are marked as 7-8 μm particles.

FIG. 8A-C depict equipment and material set-up for the studies. FIG. 8A (left) is an image of the exterior of the ATLAS Ci3000+ Xenon Weather Ometer, FIG. 8B (center) is an image of chamber of the ATLAS Ci3000+ Xenon Weather Ometer, and FIG. 8C (right) is an image of MSR 147WD to record the real time temperature of the hydrogel padding. FIG. 8D depicts temperature change of hydrogel with PCM (PVA/PCM-28 hydrogel, dashed curve) or without PCM (PVA hydrogel, dotted curve), and air (solid curve) under solar radiation. FIG. 8E depicts temperature change of three hydrogels with different formulas: a PVA/PDMS/PCM-42, 45, 32, 37, 28, 52, hydrogel (0224C formula, dashed curve), a PVA/PDMS/PCM-32, 37 hydrogel (0303 formula, dot-dashed curve), and a PVA/PDMS [no PCM] (0302 formula, dotted curve) and air (solid curve) under solar radiation.

DEFINITIONS

Figure 1:
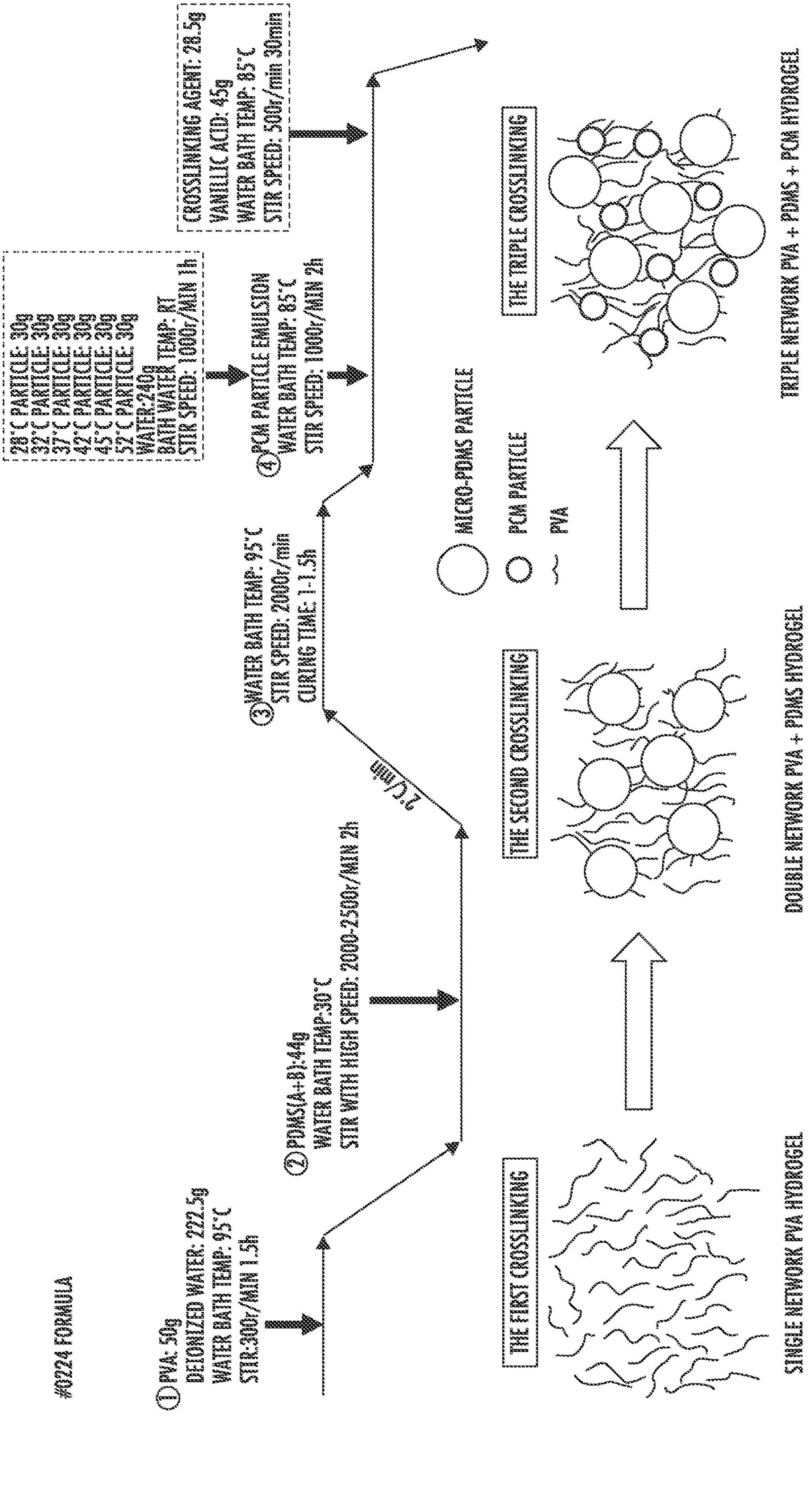
FIG. 1 is a schematic of the process for making a triple network cooling hydrogel of formula 0224.

A "cross-link" refers to a bond or short sequence of bonds that links one polymer chain to another. Exemplary cross-links are hydrogen bonds, Van der Waals interactions, and chemical bonds. A "crosslinker" refers to a chemical agent that induces chemical crosslinks between polymer chains. Exemplary crosslinkers used in a hydrogel system are glutaraldehyde, sodium borate, and boric acid.

A "curing agent" refers to a chemical additive that toughens or hardens a polymer material by cross-linking of polymer chains. Exemplary curing agents are vanillic acid and a curing agent supplied in a SYLGARD 184 silicone elastomer (Dow Corning), a two part liquid component kit of base and curing agent.

"PVA" refers to a polyvinyl alcohol. An exemplary PVA is PVA 1799 available commercially from Sinopharm Chemical Reagent Co. Ltd (Catalog No. 9002-89-5; Degree of alcoholysis: 98-99%).

"PDMS" refers to polydimethylsiloxane. An exemplary PDMS is SYLGARD 184 silicone elastomer (Dow Corning), available commercially as a two part liquid component kit of base and curing agent. SYLGARD 184 may be prepared by mixing 10 parts base to 1 part curing agent.

"PCM" refers to a phase change material. Exemplary PCM are multi-component PCM microcapsules comprising core material C18-21 alkane and shell material polyoxymethylene melamine urea, CAS:25036-13-9, available commercially from Xinneng Phase New Material Technology Co. Ltd. at phase change temperatures of 28° C., 32° C., 37° C., 42° C., 45° C., or 52° C.

A "hydrogel" refers to a crosslinked hydrophilic polymer that does not dissolve in water.

A "single network hydrogel" or "single crosslinked hydrogel" refers to a hydrogel comprising a single hydrophilic polymer.

A "double network hydrogel" or "double crosslinked hydrogel" refers to a hydrogel comprising two components to double crosslink.

A "triple network hydrogel" or "triple crosslinked hydrogel" refers to a hydrogel comprising three components to triple crosslink.

Compositions or methods "comprising" or "including" one or more recited elements may include other elements not specifically recited. For example, a composition that "comprises" or "includes" PVA may contain the PVA alone or in combination with other ingredients. When the disclosure refers to a feature comprising specified elements, the disclosure should alternatively be understood as referring to the feature consisting essentially of or consisting of the specified elements.

Designation of a range of values includes all integers within or defining the range, and all subranges defined by integers within the range.

Unless otherwise apparent from the context, the term "about" encompasses insubstantial variations, such as values within a standard margin of error of measurement (e.g., SEM) of a stated value.

Statistical significance means $p \leq 0.05$.

The singular forms of the articles "a," "an," and "the" include plural references unless the context clearly dictates otherwise. For example, the term "a PCM" or "at least one PCM" can include a plurality of PCM, including mixtures thereof.

"% w/w" refers to a percentage by weight.

DETAILED DESCRIPTION

1. General

The invention provides triple network cooling hydrogel compositions of high tensile strength, high compression, high elasticity, and long cooling period and methods of making the compositions. The triple network cooling hydrogel comprises crosslinked PVA, PDMS, and PCM, wherein the composition comprises about 4-8% w/w PVA, about 55-68% w/w water, about 15-25% w/w PCM, about 4-8% w/w PDMS, and about 0.5-2.5% w/w crosslinker.

The first crosslinking is hydrogen bonds among the PVA molecular chains, the second crosslinking is van der Waals interactions built up by PDMS microspheres inserted into the PVA network, and the PCM capsule particles act as the third crosslinking agent, which embed into the PVA+PDMS system to strengthen the network. The crosslinking agent glutaraldehyde reacts with the PVA by aldolization to form a stable triple network cooling hydrogel. Vanillic acid speeds up the aldolization reaction. Compared with single crosslinked and double crosslinked PVA hydrogel, as shown in Examples 6-7, the triple network hydrogel has excellent elastic and tensile strength with cooling function in high temperature environments.

A traditional PVA hydrogel is cross linked by hydrogen bond reaction, which is not stable and makes a hydrogel with low strength and compression. The invention modifies the single network hydrogel into triple network with PDMS as the second crosslinking function and PCM as the third crosslinking function. The triple network hydrogel is more robust and durable than art hydrogels, has high elasticity, and keeps its original shape after heavy pressure, as well has having a longer cooling period, which extends the applications for the hydrogel.

Traditional PVA hydrogels (single network hydrogel, single crosslinking) used in medical or consumer applications are disposable, easily fragile, and have low compression and tensile strength. In contrast, the triple network cooling hydrogel has robust tensile strength, high compression, and high elasticity. The multi-component phase change material (PCM) particles in the triple network cooling hydrogel provide not only cooling function but also act as the third crosslinking. The PDMS particles in the triple network cooling hydrogel provide highly durable shape and elasticity, and also act as the second crosslinking. The high water content in the triple network cooling hydrogel provides a longer cooling period because of the high specific heat capacity of the water. The triple network cooling hydrogel can be used in industrial, medical, and consumer products for cooling and calming. The triple network cooling hydrogel is useful in products for individuals who work for extended periods in hot sun, under conditions of high solar radiation and/or high temperature. The triple network hydrogel with its durable shape, robust strength, and compression with a long cooling effect provides cooling for individuals in high temperature environments and can be re-used for many years under harsh conditions.

Figure 9:
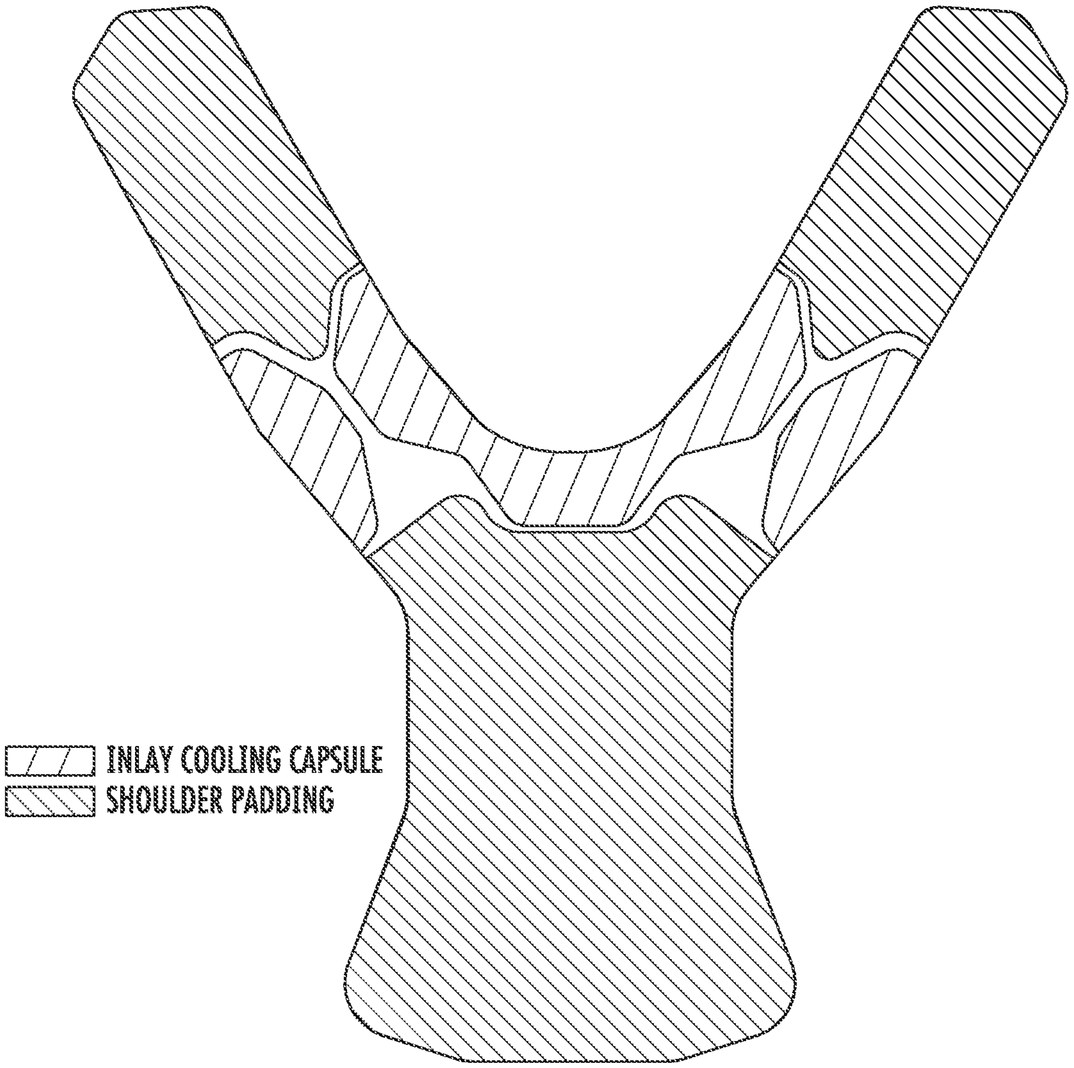
FIG. 9 is a sketch of configuration of triple network cooling padding in shoulder of a safety harness:inlay cooling capsule (wide hatching); shoulder padding (narrow hatching).

Compositions of the invention useful in providing cooling and/or compression to individuals in high solar radiation and/or high temperature environments. In an example, the individual is a utility worker, construction worker, or general industrial worker. The triple network cooling hydrogels may be used in protective article of clothing, for example a safety harness, a safety helmet, or a safety shoe. An exemplary use is in a utility harness, for example a Honeywell Miller H700 Utility Harness (Honeywell Industrial Safety, Fort Mill, SC, USA). Some safety harnesses comprise a triple network cooling hydrogel as accessory cooling padding, for example in the padding of the shoulder, waist, or leg portion of the harness. An exemplary configuration of triple network cooling hydrogel in a safety harness shoulder padding is shown in FIG. 9. A safety helmet may comprise the triple network cooling hydrogel in a helmet band or helmet suspension. A safety shoe may comprise the triple network cooling hydrogel in a safety shoe insole. Other exemplary uses are in calming products such as a fever cooling patch, wound cooling patch, and ice patch to place on skin to cool down the temperature around the tissue. Other exemplary uses are in consumer products (e.g., clothing, hats, vests, shoes) to provide cooling to individuals in high solar radiation environments and/or high temperature environments. Exemplary uses are in consumer products such as an ice patch affixed in clothing, a hat, or a backpack by Velcro to cool an area of the body. Other exemplary uses are in medical products (e.g., clothing, blankets, hats, vests) to provide cooling to individuals with a fever or with swelling of tissue, for example an ice bag used in healthcare to cold compress swollen tissue or a fever patch to cold compress forehead and armpits of an individual with a fever.

Compositions of the invention may be packaged in a capsule to prevent loss of water from the compositions during use. An exemplary capsule is sealed by polyvinyl chloride (PVC)/polyurethane (PU)/thermoplastic polyurethane (TPU)/polyvinyl chloride (PVC) bonded with fabric. Compositions may be packaged in PVC/PU/TPU film or PVC/PU/TPU coating bonded with fabric composite by ultrasonic welding or high frequency welding to prevent loss of water.

2. Methods of Preparing the Triple Network Cooling Hydrogel

A triple network cooling hydrogel of the invention comprises components as shown in Table 1.

TABLE 1

Composition of triple network cooling hydrogel

| Component | % by Weight |
|---|---|
| PVA | 4-8% |
| Water | 55-68% |
| PCM | 15-25% |
| PDMS | 4-8% |
| Crosslinker | 0.5-2.5% |

The compositions are prepared by mixing PVA with water at about 95° C. with stirring (for example at about 300 revolutions per minute) to produce a single network PVA hydrogel. This step is referred to as the first crosslinking (see FIG. 1). In the single network PVA hydrogel, the PVA molecular chains are crosslinked by hydrogen bonds.

The temperature is reduced to about 30° C., and PDMS, pre-mixed with a curing agent (for example, SYLGARD 184 silicone elastomer (Dow Corning) kit), is mixed with the single network PVA hydrogel and stirred at high speed (for example about 2000-2500 revolutions per minute) to produce a double network PVA+PDMS hydrogel. This step is referred to as the second crosslinking (see FIG. 1). In the double network PVA+PDMS hydrogel, the PDMS microspheres are crosslinked with PVA long chain molecules by van der Waals interactions.

The temperature is increased to about 95° C. at the rate of about 2° C. per minute, with stirring, to solidify the PDMS microspheres in the double network PVA+PDMS hydrogel by action of a first curing agent that had been pre-mixed into the PDMS prior to adding to the single network PVA hydrogel, to produce a double network PVA+solidified PDMS hydrogel.

The temperature is reduced to about 85° C., and a PCM emulsion comprised of PCM particles and water is added to the double network PVA+solidified PDMS hydrogel with stirring to prepare a triple network PVA+PDMS+PCM hydrogel.

The PCM capsule particles act as the third crosslinking agent, and embed into the existing double network PVA+solidified PDMS hydrogel to strengthen the network, producing a triple network PVA+PDMS+PCM hydrogel. This step is referred to as the third crosslinking (see FIG. 1).

A crosslinking agent (for example, glutaraldehyde) and optionally, a second curing agent (for example vanillic acid), are added to the triple network PVA+PDMS+PCM hydrogel at about 85° C., with stirring.

The crosslinking agent reacts with the PVA by aldolization to fix the hydrogen bonds made in the first crosslinking and build up stable chemical bonds and the second curing agent accelerates the aldolization reaction, resulting in a stable triple network PVA+PDMS+PCM hydrogel.

The stable triple network PVA+PDMS+PCM hydrogel is cooled to room temperature to yield the triple network cooling hydrogel.

3. Exemplary Triple Network Cooling Hydrogel Compositions

The compositions comprise PVA at a percentage by weight of about 4-8%, water at a percentage by weight of about 55-68%, PCM at a percentage by weight of about 15-25%, PDMS at a percentage by weight of about 4-8%, and crosslinker at a percentage by weight of about 0.5-2.5%.

The compositions include a PVA, for example PVA 1799. PVA can be present at a percentage by weight within the range from about 4-8%, 4.0-4.5%, 4.5-5.0%, 5.0-5.5%, 5.5-6.0%, 6.0-6.5%, 6.5-7.0%, 7.0%-7.5% or 7.5%-8.0%.

PVA can be present at a percentage by weight of about 4.0%, 4.5%, 5.0%, 5.5%, 6.0%, 6.5%, 7.0%, 7.5%, or 8.0%. PVA can be present at a percentage by weight of about 4.8%, 6.1%, 6.2%, 6.4%, or 6.7%. For example the PVA can be present at a percentage by weight of 4.8%, 6.1%, 6.2%, 6.4%, or 6.7%.

The compositions include a PDMS, for example PDMS from a SYLGARD 184 silicone elastomer (Dow Corning) kit. PDMS can be present at a percentage by weight within the range from about 4-8%, 4.0-4.5%, 4.5-5.0%, 5.0-5.5%, 5.5-6.0%, 6.0-6.5%, 6.5-7.0%, 7.0%-7.5% or 7.5%-8.0%. PDMS can be present at a percentage by weight of about 4.0%, 4.5%, 5.0%, 5.5%, 6.0%, 6.5%, 7.0%, 7.5%, or 8.0%. PDMS can be present at about 4.9%, 5.3%, 5.4%, 5.5%, 5.6%, or 5.8%. For example, the PDMS can be present at 4.9%, 5.3%, 5.4%, 5.5%, 5.6%, or 5.8%.

The compositions include a PCM, for example prepared from a multi-component PCM microcapsule comprising core material C18-21 alkane and shell material polyoxymethylene melamine urea, CAS:25036-13-9, at phase change temperatures of 28° C., 32° C., 37° C., 42° C., 45° C., or 52° C. (Xinneng Phase New Material Technology Co. Ltd.). PCM as used in the methods herein is prepared, for example, from a multi-component PCM microcapsule comprising core material C18-21 alkane and shell material polyoxymethylene melamine urea, CAS:25036-13-9, at phase change temperatures of 28° C., 32° C., 37° C., 42° C., 45° C., or 52° C. (Xinneng Phase New Material Technology Co. Ltd.). In some embodiments, multi-component PCM microcapsules are mixed with water and incubated at room temperature with stirring to prepare a PCM particle emulsion. PCM can be present in the compositions of the invention at a percentage by weight within the range from about 15-25%, 15-16%, 16-17%, 17-18%, 18-19%, 19-20%, 20-21%, 21-22%, 22-23%, 23-24%, or 24-25%. The PCM can be present at a percentage by weight of about 15%, 16%, 17%, 18%, 19%, 20%, 21%, 22%, 23%, 24%, or 25%. For example, the PCM can be present at a percentage by weight of 18%, 19%, 21%, or 22%.

The compositions include water. Water can be present at a percentage by weight within the range from about 55-68%, 55-56%, 56-57%, 57-58%, 58-59%, 59-60%, 60-61%, 61-62%, 62-63%, 63-64%, 64-65%, 65-66%, 66-67%, or 67-68%. Water can be present at a percentage by weight of about 55%, 56%, 57%, 58%, 59%, 60%, 61%, 62%, 63%, 64%, 65%, 66%, 67%, or 68%. For example, water can be present at a percentage of 57%, 58%, 59%, 63%, or 64%.

The compositions include crosslinker, for example glutaraldehyde. Crosslinker can be present at a percentage by weight within the range from about 0.5-2.5%, 0.5-1.0%, 1.0-1.5%, 1.5-2.0%, or 2.0-2.5%. Crosslinker can be present at a percentage by weight of about 0.5%, 1.0%, 1.5%, 2.0%, or 2.5%. Crosslinker can be present at a percentage by weight of about 0.72%, 0.87%, 0.91%, 0.99%, 1.7%, or 2.1%. For example, crosslinker can be present at a percentage by weight of 0.72%, 0.87%, 0.91%, 0.99%, 1.7%, or 2.1%.

Vanillic acid can be present at a percentage by weight of about 0.68%, 0.85%, 0.89%, or 0.92%. For example, vanillic acid can be present at 0.68%, 0.85%, 0.89%, or 0.92%.

TABLE 2

Formula 0224

| Component | Weight | % by Weight (total 810 g) |
|---|---|---|
| PVA 1799 | 50 g | 6.1% |
| water | 462.5 g | 57% |
| PCM 42 particle | 30 g | Total PCM 22% |
| PCM 45 particle | 30 g | |
| PCM 32 particle | 30 g | |
| PCM 37 particle | 30 g | |
| PCM 28 particle | 30 g | |
| PCM 52 particle | 30 g | |
| PDMS Dow Corning 184(10:1) | 44 g (10:1) | 5.4% |
| 25% glutaraldehyde | 28.5 g | 0.87% |
| 16% Vanillic acid | 45 g | 0.89% |

TABLE 3

Formula of triple network cooling hydrogel crosslinked with 28° C./32° C. PCM capsule particles

| Component | Weight | % by Weight (total 188.5 g) |
|---|---|---|
| PVA 1799 | 12 g | 6.4% |
| water | 50 g(PVA solution) + 60 g(PCM emulsion) | 58% |
| PCM 28 particle | 20 g | Total PCM: 21% |

TABLE 3-continued

| Formula of triple network cooling hydrogel crosslinked with 28° C./32° C. PCM capsule particles | | |
|---|---|---|
| Component | Weight | % by Weight (total 188.5 g) |
| PCM 32 particle | 20 g | |
| PDMS Dow Corning 184(10:1) | 11 g (10:1) | 5.8% |
| 25% Glutaraldehyde | 7.5 g | 0.99% |
| 16% Vanillic acid | 8 g | 0.68% |

TABLE 4

| Formula of triple network cooling hydrogel crosslinked with 28° C./32° C./42° C./52° C. PCM capsule particles | | |
|---|---|---|
| Component | weight | % by Weight (total 416 g) |
| PVA 1799 | 20 g | 4.8% |
| water | 100 g (PVA solution) + 160 g (PCM emulsion) | 63% |
| PCM 52 particle | 20 g | Total PCM 19% |
| PCM 42 particle | 20 g | |
| PCM 32 particle | 20 g | |
| PCM 28 particle | 20 g | |
| PDMS Dow Corning 184(10:1) | 22 g (10:1) | 5.3% |
| 16% Vanillic acid | 22 g | 0.85% |
| 25% Glutaraldehyde | 12 g | 0.72% |

TABLE 5

| Formula of triple network cooling hydrogel crosslinked with 28° C./32° C./37° C./42° C./52° C. PCM capsule particles | | |
|---|---|---|
| Component | weight | % by Weight (total 780 g) |
| PVA 1799 | 50 g | 6.4% |
| water | 222.5 g(PVA solution) + 240 g (in PCM emulsion) | 59% |
| PCM 52 particle | 30 g | Total PCM 19% |
| PCM 42 particle | 30 g | |
| PCM 37 particle | 30 g | |
| PCM 32 particle | 30 g | |
| PCM 28 particle | 30 g | |
| PDMS Dow Corning 184(10:1) | 44 g (10:1) | 5.6% |
| 16% Vanillic acid | 45 g | 0.92% |
| 25% Glutaraldehyde | 28.5 g | 0.91% |

TABLE 6

| Formula 0224C | | |
|---|---|---|
| Component | weight | % by Weight (total 804.5 g) |
| PVA 1799 | 50 g | 6.2% |
| water | 462.5 g | 57% |
| PCM 42 particle | 30 g | Total PCM 22% |
| PCM 45 particle | 30 g | |
| PCM 32 particle | 30 g | |
| PCM 37 particle | 30 g | |
| PCM 28 particle | 30 g | |
| PCM 52 particle | 30 g | |
| PDMS Dow Corning 184(10:1) | 44 g (10:1) | 5.5% |
| 25% glutaraldehyde | 68 g | 2.1% |

TABLE 7

| Formula 0303 | | |
|---|---|---|
| Component | weight | % by Weight (total 223 g) |
| PVA 1799 | 15 g | 6.7% |
| water | 142 g | 64% |
| PCM 32 particle | 20 g | Total PCM 18% |
| PCM 37 particle | 20 g | |
| PDMS Dow Corning 184(10:1) | 11 g (10:1) | 4.9% |
| 25% glutaraldehyde | 15 g | 1.7% |

4. Exemplary Methods of Preparing the Triple Network Cooling Hydrogel

Exemplary methods of preparing triple network cooling hydrogels of the invention are provided in FIG. 1 and Example 1.

In some embodiments, the PDMS is packaged with a first curing agent and is mixed with the first curing agent prior to use in the method. In some embodiments, the crosslinking agent is glutaraldehyde. In some embodiments, the second curing agent is vanillic acid.

5. Phase Change Materials Useful in the Invention

Phase change materials useful in the invention include multi-component PCM microcapsules. Exemplary PCM microcapsules comprise a core material of C18-21 alkane and a shell material of polyoxymethylene melamine urea, CAS:25036-13-9.

PCM microcapsules are available in a range of phase change temperatures including, for example, 28° C./32° C./37° C./42° C./45° C./52° C. PCMs of specified phase change temperatures may be chosen for use in compositions of the invention for use in cooling in a range of temperature environments.

Some triple network cooling hydrogels of the invention comprise at least one PCM selected from the group consisting of a PCM of phase change temperature 28° C. (also referred to as PCM 28, PCM 28 particle, 28° C. particle), a PCM of phase change temperature 32° C. (also referred to as PCM 32, PCM 32 particle, 32° C. particle), a PCM of phase change temperature 37° C. (also referred to as PCM 37, PCM 37 particle, 37° C. particle), a PCM of phase change temperature 42° C. (also referred to as PCM 42, PCM 42 particle, 42° C. particle), a PCM of phase change temperature 45° C. (also referred to as PCM 45, PCM 45 particle, 45° C. particle), and a PCM of phase change temperature 52° C. (also referred to as PCM 52, PCM 52 particle, 52° C. particle). Some triple network cooling hydrogels comprise at least two PCM selected from the group consisting of a PCM of phase change temperature 28° C., a PCM of phase change temperature 32° C., a PCM of phase change temperature 37° C., a PCM of phase change temperature 42° C., a PCM of phase change temperature 45° C., and a PCM of phase change temperature 52° C. Some triple network cooling hydrogels comprise at least three PCM selected from the group consisting of a PCM of phase change temperature 28° C., a PCM of phase change temperature 32° C., a PCM of phase change temperature 37° C., a PCM of phase change temperature 42° C., a PCM of phase change temperature 45° C., and a PCM of phase change temperature 52° C. Some triple network cooling hydrogels comprise at least four PCM selected from the group consisting of a PCM of phase change temperature 28° C., a PCM of phase change temperature 32° C., a PCM of phase change temperature 37° C., a PCM of phase change temperature 42° C., a PCM of phase change temperature 45° C., and a PCM of phase change temperature 52° C. Some triple network cooling hydrogels comprise at least five PCM selected from the group consisting of a PCM of phase change temperature 28° C., a PCM of phase change temperature 32° C., a PCM of phase change temperature 37° C., a PCM of phase change temperature 42° C., a PCM of phase change temperature 45° C., and a PCM of phase change temperature 52° C. Some triple network cooling hydrogels comprise a PCM of phase change temperature 28° C., a PCM of phase change temperature 32° C., a PCM of phase change temperature 37° C., a PCM of phase change temperature 42° C., a PCM of phase change temperature 45° C., and a PCM of phase change temperature 52° C.

Some triple network cooling hydrogels of the invention comprise a PCM of phase change temperature 28° C. and a PCM of phase change temperature 32° C. Some triple network cooling hydrogels of the invention comprise a PCM of phase change temperature 28° C. and a PCM of phase change temperature 37° C. Some triple network cooling hydrogels of the invention comprise a PCM of phase change temperature 28° C. and a PCM of phase change temperature 42° C. Some triple network cooling hydrogels of the invention comprise a PCM of phase change temperature 28° C. and a PCM of phase change temperature 45° C. Some triple network cooling hydrogels of the invention comprise a PCM of phase change temperature 28° C. and a PCM of phase change temperature 52° C.

Some triple network cooling hydrogels of the invention comprise a PCM of phase change temperature 32° C. and a PCM of phase change temperature 37° C. Some triple network cooling hydrogels of the invention comprise a PCM of phase change temperature 32° C. and a PCM of phase change temperature 42° C. Some triple network cooling hydrogels of the invention comprise a PCM of phase change temperature 32° C. and a PCM of phase change temperature 45° C. Some triple network cooling hydrogels of the invention comprise a PCM of phase change temperature 32° C. and a PCM of phase change temperature 52° C. Some triple network cooling hydrogels of the invention comprise a PCM of phase change temperature 37° C. and a PCM of phase change temperature 42° C.

Some triple network cooling hydrogels of the invention comprise a PCM of phase change temperature 37° C. and a PCM of phase change temperature 45° C. Some triple network cooling hydrogels of the invention comprise a PCM of phase change temperature 37° C. and a PCM of phase change temperature 52° C. Some triple network cooling hydrogels of the invention comprise a PCM of phase change temperature 42° C. and a PCM of phase change temperature 45° C. Some triple network cooling hydrogels of the invention comprise a PCM of phase change temperature 42° C. and a PCM of phase change temperature 52° C. Some triple network cooling hydrogels of the invention comprise a PCM of phase change temperature 45° C. and a PCM of phase change temperature 52° C.

Some triple network cooling hydrogels of the invention comprise a PCM of phase change temperature 28° C., a PCM of phase change temperature 32° C., and a PCM of phase change temperature 37° C. Some triple network cooling hydrogels of the invention comprise a PCM of phase change temperature 28° C., a PCM of phase change temperature 32° C., and a PCM of phase change temperature 42° C. Some triple network cooling hydrogels of the invention comprise a PCM of phase change temperature 28° C., a PCM of phase change temperature 32° C., and a PCM of phase change temperature 45° C. Some triple network cooling hydrogels of the invention comprise a PCM of phase change temperature 28° C., a PCM of phase change temperature 32° C., and a PCM of phase change temperature 52° C. Some triple network cooling hydrogels of the invention comprise a PCM of phase change temperature 28° C., a PCM of phase change temperature 37° C., and a PCM of phase change temperature 42° C.

Some triple network cooling hydrogels of the invention comprise a PCM of phase change temperature 28° C., a PCM of phase change temperature 37° C., and a PCM of phase change temperature 45° C. Some triple network cooling hydrogels of the invention comprise a PCM of phase change temperature 28° C., a PCM of phase change temperature 37° C., and a PCM of phase change temperature 52° C. Some triple network cooling hydrogels of the invention comprise a PCM of phase change temperature 28° C., a PCM of phase change temperature 42° C., and a PCM of phase change temperature 45° C. Some triple network cooling hydrogels of the invention comprise a PCM of phase change temperature 28° C., a PCM of phase change temperature 42° C., and a PCM of phase change temperature 52° C. Some triple network cooling hydrogels of the invention comprise a PCM of phase change temperature 28° C., a PCM of phase change temperature 45° C., and a PCM of phase change temperature 52° C.

Some triple network cooling hydrogels of the invention comprise a PCM of phase change temperature 42° C., a PCM of phase change temperature 45° C., and a PCM of phase change temperature 52° C. Some triple network cooling hydrogels of the invention comprise a PCM of phase change temperature 37° C., a PCM of phase change temperature 45° C., and a PCM of phase change temperature 52° C. Some triple network cooling hydrogels of the invention comprise a PCM of phase change temperature 37° C., a PCM of phase change temperature 42° C., and a PCM of phase change temperature 52° C. Some triple network cooling hydrogels of the invention comprise a PCM of phase change temperature 37° C., a PCM of phase change temperature 42° C., and a PCM of phase change temperature 45° C. Some triple network cooling hydrogels of the invention comprise a PCM of phase change temperature 32° C., a PCM of phase change temperature 45° C., and a PCM of phase change temperature 52° C.

Some triple network cooling hydrogels of the invention comprise a PCM of phase change temperature 32° C., a PCM of phase change temperature 42° C., and a PCM of phase change temperature 52° C. Some triple network cooling hydrogels of the invention comprise a PCM of phase change temperature 32° C., a PCM of phase change temperature 42° C., and a PCM of phase change temperature 45° C. Some triple network cooling hydrogels of the invention comprise a PCM of phase change temperature 32° C., a PCM of phase change temperature 37° C., and a PCM of phase change temperature 52° C. Some triple network cooling hydrogels of the invention comprise a PCM of phase change temperature 32° C., a PCM of phase change temperature 37° C., and a PCM of phase change temperature 45° C. Some triple network cooling hydrogels of the invention comprise a PCM of phase change temperature 32° C., a PCM of phase change temperature 37° C., and a PCM of phase change temperature 42° C.

Some triple network cooling hydrogels of the invention comprise a PCM of phase change temperature 37° C., a PCM of phase change temperature 42° C., a PCM of phase change temperature 45° C., and a PCM of phase change temperature 52° C. Some triple network cooling hydrogels of the invention comprise a PCM of phase change temperature 32° C., a PCM of phase change temperature 42° C., a PCM of phase change temperature 45° C., and a PCM of phase change temperature 52° C. Some triple network cooling hydrogels of the invention comprise a PCM of phase change temperature 32° C., a PCM of phase change temperature 37° C., a PCM of phase change temperature 45° C., and a PCM of phase change temperature 52° C. Some triple network cooling hydrogels of the invention comprise a PCM of phase change temperature 32° C., a PCM of phase change temperature 37° C., a PCM of phase change temperature 42° C., and a PCM of phase change temperature 52° C. Some triple network cooling hydrogels of the invention comprise a PCM of phase change temperature 32° C., a PCM of phase change temperature 37° C., a PCM of phase change temperature 42° C., and a PCM of phase change temperature 45° C.

Some triple network cooling hydrogels of the invention comprise a PCM of phase change temperature 28° C., a PCM of phase change temperature 42° C., a PCM of phase change temperature 45° C., and a PCM of phase change temperature 52° C. Some triple network cooling hydrogels of the invention comprise a PCM of phase change temperature 28° C., a PCM of phase change temperature 37° C., a PCM of phase change temperature 45° C., and a PCM of phase change temperature 52° C. Some triple network cooling hydrogels of the invention comprise a PCM of phase change temperature 28° C., a PCM of phase change temperature 37° C., a PCM of phase change temperature 42° C., and a PCM of phase change temperature 52° C. Some triple network cooling hydrogels of the invention comprise a PCM of phase change temperature 28° C., a PCM of phase change temperature 37° C., a PCM of phase change temperature 42° C., and a PCM of phase change temperature 45° C. Some triple network cooling hydrogels of the invention comprise a PCM of phase change temperature 28° C., a PCM of phase change temperature 32° C., a PCM of phase change temperature 45° C., and a PCM of phase change temperature 52° C.

Some triple network cooling hydrogels of the invention comprise a PCM of phase change temperature 28° C., a PCM of phase change temperature 32° C., a PCM of phase change temperature 42° C., and a PCM of phase change temperature 52° C. Some triple network cooling hydrogels of the invention comprise a PCM of phase change temperature 28° C., a PCM of phase change temperature 32° C., a PCM of phase change temperature 42° C., and a PCM of phase change temperature 45° C. Some triple network cooling hydrogels of the invention comprise a PCM of phase change temperature 28° C., a PCM of phase change temperature 32° C., a PCM of phase change temperature 37° C., and a PCM of phase change temperature 52° C. Some triple network cooling hydrogels of the invention comprise a PCM of phase change temperature 28° C., a PCM of phase change temperature 32° C., a PCM of phase change temperature 37° C., and a PCM of phase change temperature 45° C. Some triple network cooling hydrogels of the invention comprise a PCM of phase change temperature 28° C., a PCM of phase change temperature 32° C., a PCM of phase change temperature 37° C., and a PCM of phase change temperature 42° C.

Some triple network cooling hydrogels of the invention comprise a PCM of phase change temperature 32° C., a PCM of phase change temperature 37° C., a PCM of phase change temperature 42° C., a PCM of phase change temperature 45° C., and a PCM of phase change temperature 52° C. Some triple network cooling hydrogels of the invention comprise a PCM of phase change temperature 28° C., a PCM of phase change temperature 37° C., a PCM of phase change temperature 42° C., a PCM of phase change temperature 45° C., and a PCM of phase change temperature 52° C. Some triple network cooling hydrogels of the invention comprise a PCM of phase change temperature 28° C., a PCM of phase change temperature 32° C., a PCM of phase change temperature 42° C., a PCM of phase change temperature 45° C., and a PCM of phase change temperature 52° C. Some triple network cooling hydrogels of the invention comprise a PCM of phase change temperature 28° C., a PCM of phase change temperature 32° C., a PCM of phase change temperature 37° C., a PCM of phase change temperature 45° C., and a PCM of phase change temperature 52° C. Some triple network cooling hydrogels of the invention comprise a PCM of phase change temperature 28° C., a PCM of phase change temperature 32° C., a PCM of phase change temperature 37° C., a PCM of phase change temperature 42° C., and a PCM of phase change temperature 52° C. Some triple network cooling hydrogels of the invention comprise a PCM of phase change temperature 28° C., a PCM of phase change temperature 32° C., a PCM of phase change temperature 37° C., a PCM of phase change temperature 42° C., and a PCM of phase change temperature 45° C.

3. Properties of the Triple Network Cooling Hydrogel

Figure 5A:
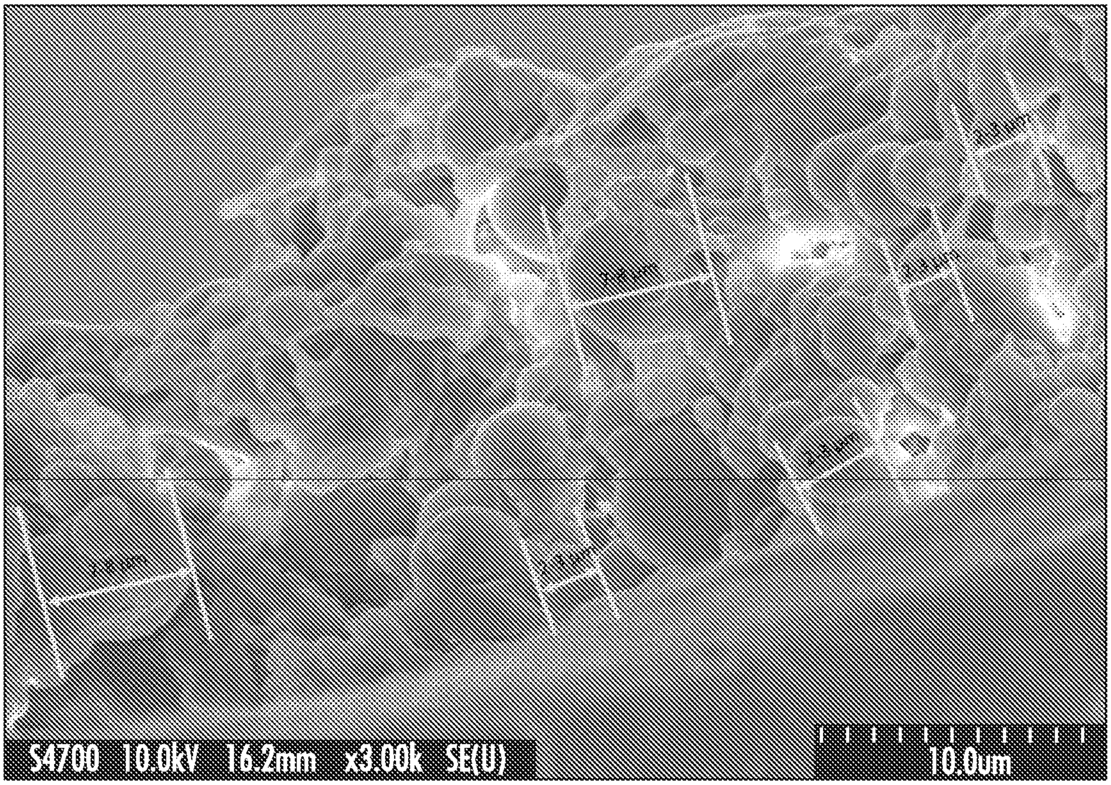
FIGS. 5A, 5B, and 5C depict triple network cooling hydrogel microstructure of a hydrogel crosslinked with 28° C./32° C. PCM capsule particles, analyzed by scanning electron microscopy (SEM), shown at decreasing magnifications, from FIG. 5A to FIG. 5B to FIG. 5C.
Figure 5B:
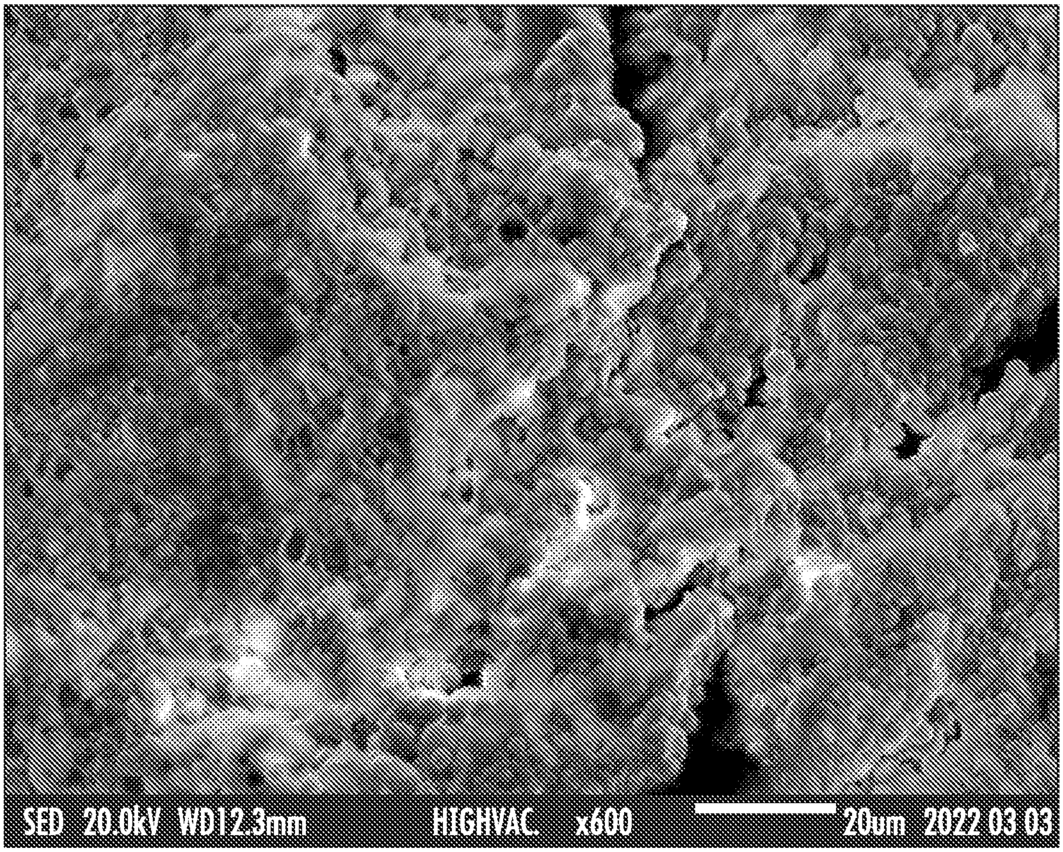
Figure 5C:
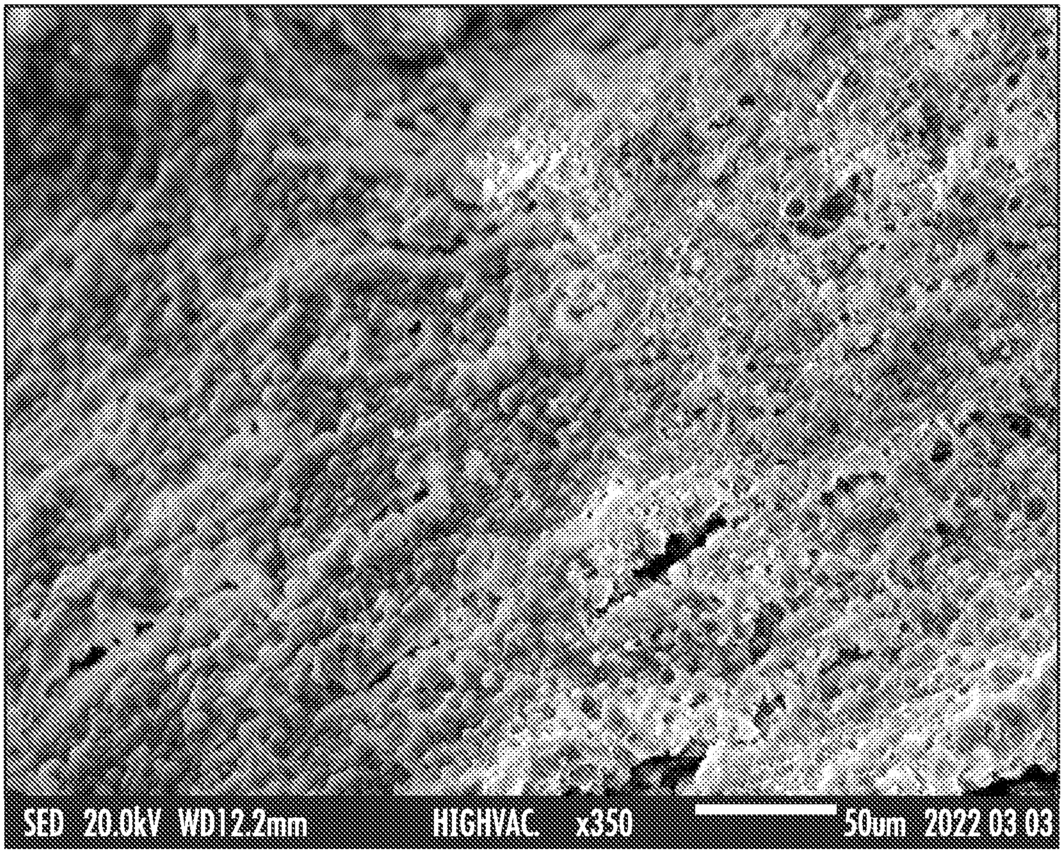

The scanning electron microscopy experiments as described in Example 5 and FIGS. 5A-C show the synthetic hydrogel structure has a triple network crosslinking.

Figure 2:
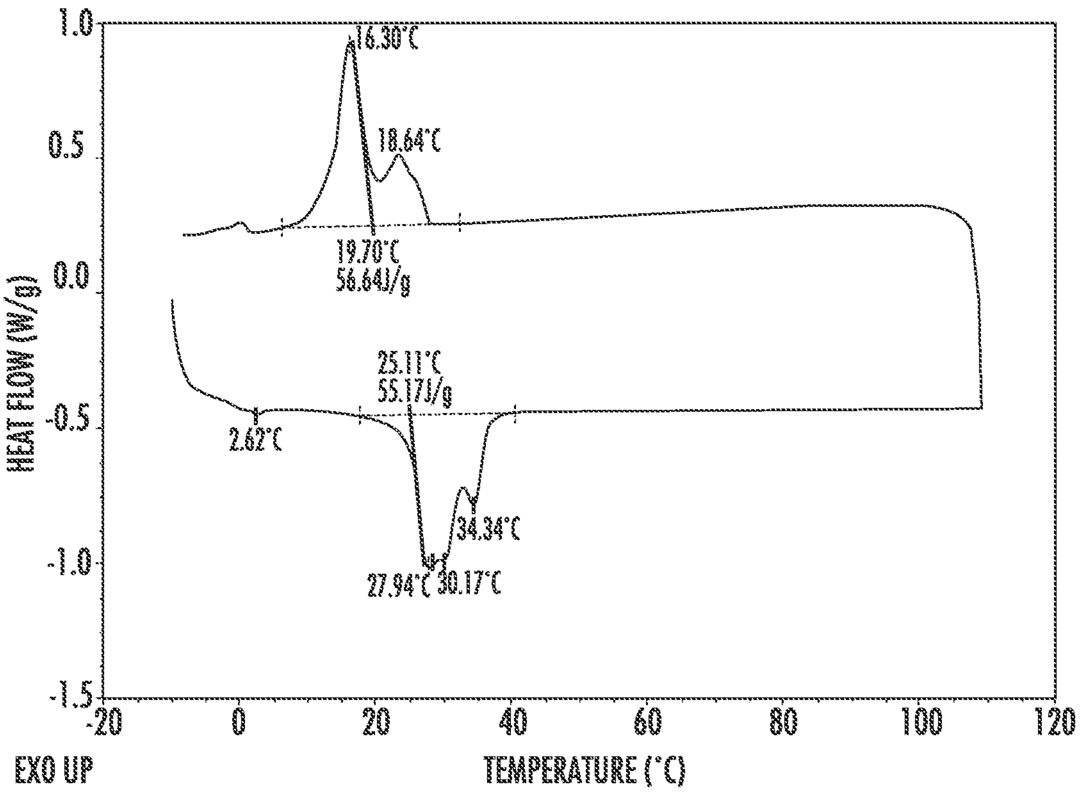
FIG. 2 depicts differential scanning calorimetry (DSC) analysis of a triple network cooling hydrogel crosslinked with 28° C./32° C. PCM capsule particles.
Figure 3:
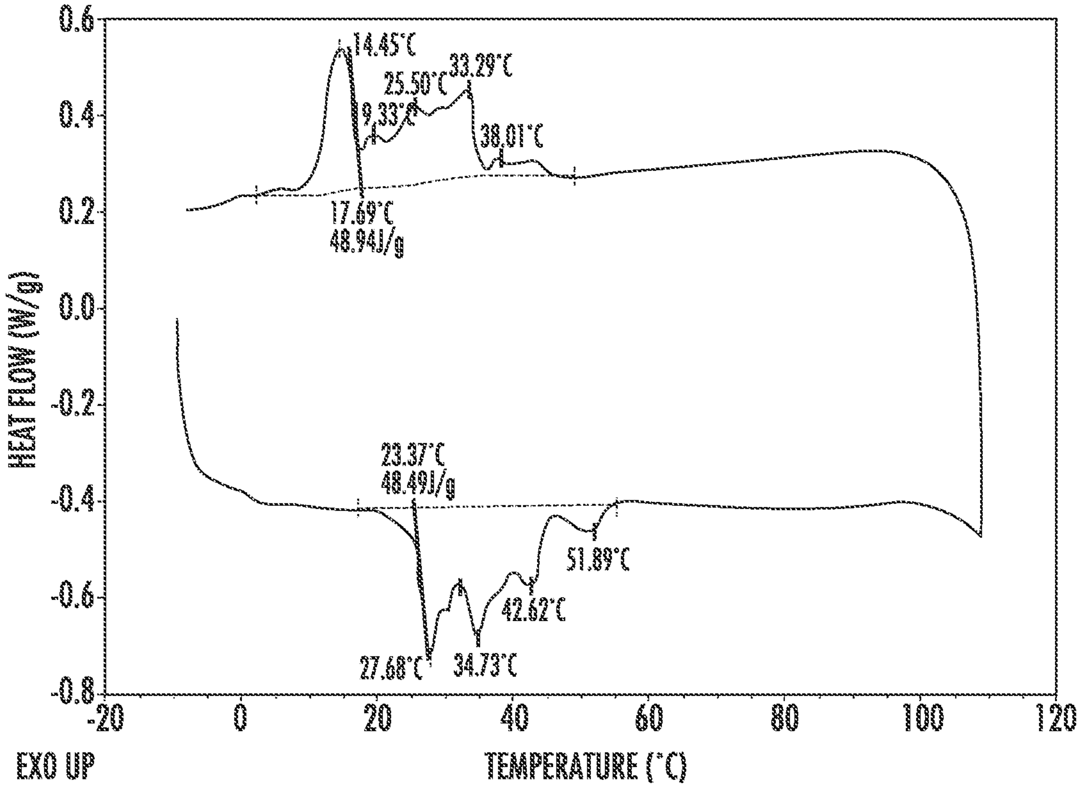
FIG. 3 depicts differential scanning calorimetry (DSC) analysis of a triple network cooling hydrogel crosslinked with 28° C./32° C./42° C./52° C. PCM capsule particles.
Figure 4:
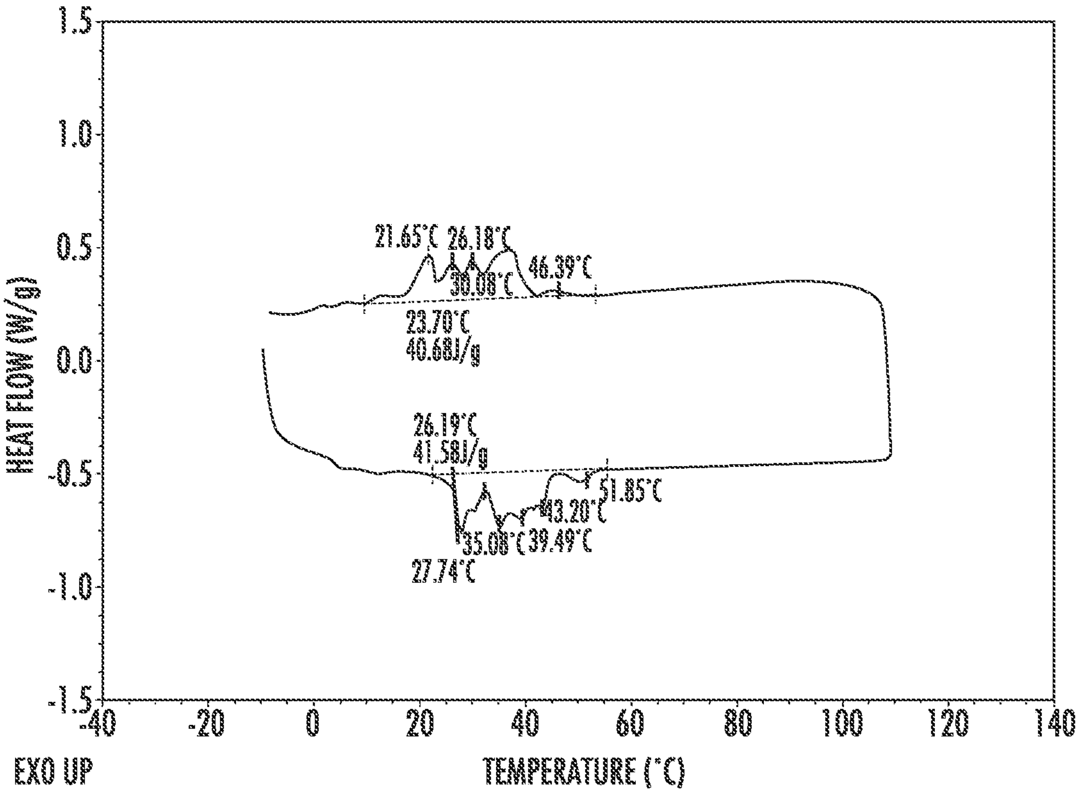
FIG. 4 depicts differential scanning calorimetry (DSC) analysis of a triple network cooling hydrogel crosslinked with 28° C./32° C./37° C./42° C./52° C. PCM capsule particles.

The differential scanning calorimetry experiments as described in Examples 2-4 and FIG. 2-4 show that the phase change temperatures can be designed at varying temperature range conditions.

Figure 6:
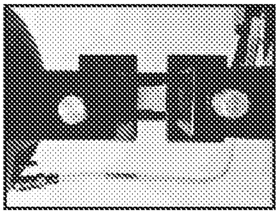
FIG. 6 depicts results of tensile strength tests comparing triple network cooling hydrogel (crosslinked with 28° C./32° C./37° C./42° C./52° C. PCM capsule particles) to normal hydrogel (PVA 1799 without PDMS or PCM).
Figure 6:
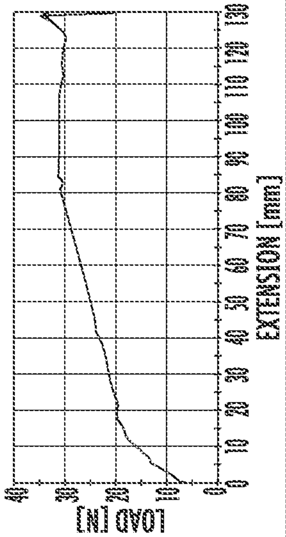
Figure 6:
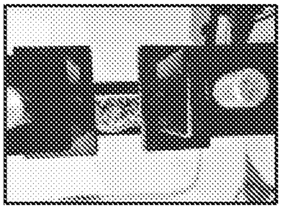
Figure 6:
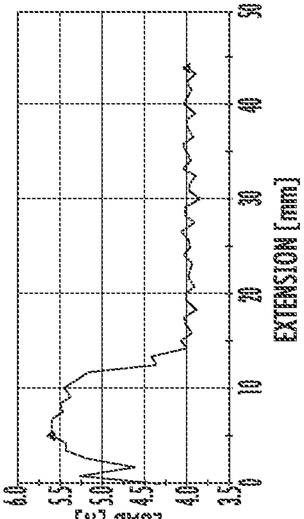

Tensile strength tests as described in Example 6 and FIG. 6 show how the compositions of the invention provide 6-fold improved tensile strength over a single network PVA hydrogel and 25-fold improved elongation over a single network PVA hydrogel.

Figure 7:
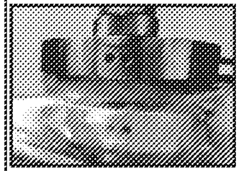
FIG. 7 depicts results of compression tests comparing triple network cooling hydrogel (crosslinked with 28° C./32° C./37° C./42° C./52° C. PCM capsule particles) to normal hydrogel (PVA 1799 without PDMS or PCM).
Figure 7:
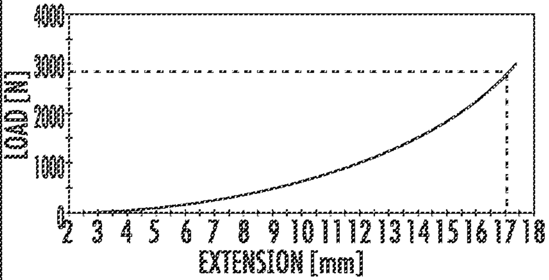
Figure 7:
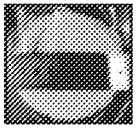
Figure 7:
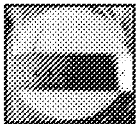
Figure 7:
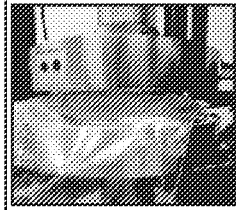
Figure 7:
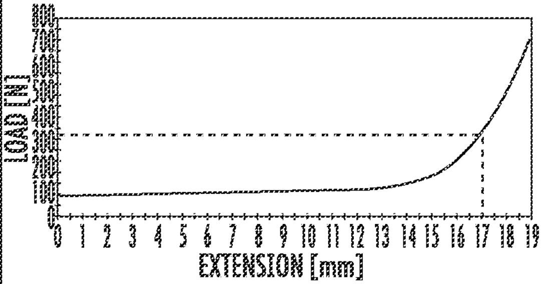
Figure 7:
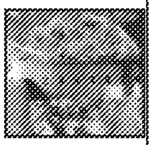
Figure 7:
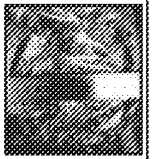

The compression tests as described in Example 6 and FIG. 7 show how compositions of the invention provide 10-fold more compression over a single network PVA hydrogel, and show that compositions of the invention have improved elasticity over a single network hydrogel. Compositions of the invention return to original size after compression unlike a single network PVA hydrogel which deformed after compression. The cooling period tests as described in Example 7 and FIGS. 8A-B which simulate solar radiation show how compositions of the invention have a lower temperature and provide improved cooling over double network PVA PDMS hydrogel without PCM.

Compositions of the invention may be re-used by reversing the phase change of the PCM in the triple network hydrogel by cooling to a lower temperature, for example about 4-6° C., about 10° C.-20° C., or about 24° C. for minutes or hours before subsequent use. Storage period at lower temperature depends on the weight of the triple network cooling hydrogel, the heavier the hydrogel, the higher the enthalpy, and the longer storage cycle time before re-use. Storage period at lower temperature also depends on proportion of PCM in the hydrogel system. The higher proportion of PCM, the higher enthalpy of phase change, and the longer storage cycle time before re-use. For triple network hydrogel cooling padding used in a utility harness, for example a Honeywell Miller H700 Utility Harness (Honeywell Industrial Safety, Fort Mill, SC, USA), comprising about 100 g triple network cooling hydrogel for each capsule, exemplary cooling periods storage cycle times are about 24° C. for about one hour or 4° C.-6° C. for about 15-20 minutes. Triple network cooling hydrogel padding can be re-used after the storage cycle.

All patent filings, websites, other publications, CAS numbers and the like cited above or below are incorporated by reference in their entirety for all purposes to the same extent as if each individual item were specifically and individually indicated to be so incorporated by reference. The effective filing date means the earlier of the actual filing date or filing date of a priority application referring to the accession number if applicable. Likewise if different versions of a publication, website or the like are published at different times, the version most recently published at the effective filing date of the application is meant unless otherwise indicated. Any feature, step, element, embodiment, or aspect of the invention can be used in combination with any other unless specifically indicated otherwise. Although the present invention has been described in some detail by way of illustration and example for purposes of clarity and understanding, it will be apparent that certain changes and modifications may be practiced within the scope of the appended claims.

EXAMPLES

Example 1: Synthesis Procedure for Triple Network Hydrogels

1. Reagents:

TABLE 8

Reagents

| Reagent | Supplier |
|---|---|
| PVA 1799 | Sinopharm Chemical Reagent Co. Ltd. (Catalog No. XW90028956). CAS: 9002-89-5 Degree of alcoholysis: 98-99% |
| Vanillic acid | Sinopharm Chemical Reagent Co. Ltd. CAS: 121-34-6 |
| 25% Glutaraldehyde solution | Sinopharm Chemical Reagent Co. Ltd. CAS: 111-30-8 |
| PCM microcapsule(multi-components) phase change temperature at 28° C./32° C./37° C./42° C./45° C./52° C. | Xinneng Phase New Material Technology Co. Ltd. |
| PDMS SYLGARD 184 Silicone Elastomer (two part kit, 10 to 1 mix ratio of base and curing agent) | Dow Corning |

2. Preparation of PCM Emulsion

In an example, the PCM particle emulsion was prepared by mixing 30 g PCM-28 microcapsules, 30 g PCM-32 microcapsules, 30 g PCM-42 microcapsules, 30 g PCM 45 microcapsules, and 30 g PCM 52 microcapsules with 240 g water in a room temperature water bath and stirred at 1000 revolutions/minute (IKA RW20DZM stirrer) for 1 hr.

3. Preparation of 16% Vanillic Acid

Deionized water is added to vanillic acid to prepare 16% (w/w) vanillic acid.

4. Preparation Procedure

The triple network cooling hydrogel was prepared by the following steps:

1) PVA1799 was added into the deionized water (see Examples 2-7 for exemplary amounts) in a 95° C. water bath and stirred at 300 revolutions/minute (IKA RW20DZM stirrer) for 1.5 hours till the PVA1799 was totally dissolved.
2) The water bath temperature was reduced to 30° C., and pre-prepared PDMS solvent and curing agent (A+B) were added (see Examples 2-7 for exemplary amounts), and stirred at high speed 2000-2500 revolutions/minute (IKA RW20DZM stirrer) for 2 hours.
3) The temperature was increased to 95° C. at the rate of 2° C./minute to solidify the PDMS microspheres at stir speed of 2000 revolutions/minute (IKA RW20DZM stirrer) for 1-1.5 hours.
4) The water bath temperature was reduced to 85° C., and pre-prepared PCM emulsion (see Example 1, part 2, for exemplary amounts for an emulsion of PCM-28 microcapsules, PCM-32 microcapsules, PCM-42 microcapsules, PCM 45 microcapsules, and PCM 52 microcapsules) was added and stirred at stir speed 1000 revolutions/minute (IKA RW20DZM stirrer) for 2 hours.
5) Crosslinking agent glutaraldehyde (see Examples 2-7 for exemplary amounts) was added to react with the PVA at 85° C., and optionally vanillic acid (see Examples 2-7 for exemplary amounts) was added dropwise, and the mixture stirred at stir speed 500 revolutions/minute (IKA RW20DZM stirrer) for 30 minutes.
6) The temperature was reduced to room temperature to obtain the triple network cooling hydrogel.

Example 2: Preparation of Triple Network Cooling Hydrogel Crosslinked with 28° C./32° C. PCM Capsule Particles and DSC Analysis Triple network cooling hydrogel crosslinked with 28° C./32° C. PCM capsule particles was prepared with composition as in Table 9.

TABLE 9

Composition of triple network cooling hydrogel crosslinked with 28° C./32° C. PCM capsule particles

| Component | Weight | % by Weight (total 188.5 g) |
|---|---|---|
| PVA 1799 | 12 g | 6.4% |
| water | 50 g(PVA solution) + 60 g(PCM emulsion) | 58% |
| PCM 28 particle | 20 g | Total PCM: 21% |
| PCM 32 particle | 20 g | |
| PDMS Dow Corning 184(10:1) | 11 g (10:1) | 5.8% |
| 25% Glutaraldehyde | 7.5 g | 0.99% |
| 16% Vanillic acid | 8 g | 0.68% |

Triple network cooling hydrogel crosslinked with 28° C./32° C. PCM capsule particles was analyzed by differential scanning calorimetry (DSC) using a TA Instruments Q20. Results are depicted in FIG. 2. The curve in the bottom of FIG. 2 demonstrates the endothermic process with the two peaks of phase change melting at 27.94° C. and 34.34° C., responding with the composite phase change capsule at the phase change temperature of 28° C. and 32° C.

Example 3: Preparation of Triple Network Cooling Hydrogel Crosslinked with 28° C./32° C./42° C./52° C. PCM Capsule Particles and DSC Analysis Triple network cooling hydrogel crosslinked with 28° C./32° C./42° C./52° C. PCM capsule particles was prepared with composition as in Table 10.

TABLE 10

| Composition of triple network cooling hydrogel crosslinked with 28° C./32° C./42° C./52° C. PCM capsule particles | | |
|---|---|---|
| Component | weight | % by Weight (total 416 g) |
| PVA 1799 | 20 g | 4.8% |
| water | 100 g (PVA solution) + 160 g (PCM emulsion) | 63% |
| PCM 52 particle | 20 g | Total PCM 19% |
| PCM 42 particle | 20 g | |
| PCM 32 particle | 20 g | |
| PCM 28 particle | 20 g | |
| PDMS Dow Corning 184(10:1) | 22 g (10:1) | 5.3% |
| 16% Vanillic acid | 22 g | 0.85% |
| 25% Glutaraldehyde | 12 g | 0.72% |

Triple network cooling hydrogel crosslinked with 28° C./32° C./42° C./52° C. PCM capsule particles was analyzed by differential scanning calorimetry (DSC) using a TA Instruments Q20. Results are depicted in FIG. 3. The curve in the bottom of FIG. 3 demonstrates the endothermic process with the four peaks of phase change melting at 27.6° C./34.73° C./42.62° C./51.89° C., responding with the composite phase change capsule at the phase change temperature of 28° C./32° C./42° C./52° C.

Example 4: Preparation of Triple Network Cooling Hydrogel Crosslinked with 28° C./32° C./37° C./42° C./52° C. PCM Capsule Particles and DSC Analysis Triple network cooling hydrogel crosslinked with 28° C./32° C./37° C./42° C./52° C. PCM capsule particles was prepared with composition as in Table 11.

TABLE 11

| Composition of triple network cooling hydrogel crosslinked with 28° C./32° C./37° C./42° C./52° C. PCM capsule particles | | |
|---|---|---|
| Component | weight | % by Weight (total 780 g) |
| PVA 1799 | 50 g | 6.4% |
| water | 222.5 g(PVA solution) + 240 g (in PCM emulsion) | 59% |
| PCM 52 particle | 30 g | Total PCM 19% |
| PCM 42 particle | 30 g | |
| PCM 37 particle | 30 g | |
| PCM 32 particle | 30 g | |
| PCM 28 particle | 30 g | |
| PDMS Dow Corning 184(10:1) | 44 g (10:1) | 5.6% |
| 16% Vanillic acid | 45 g | 0.92% |
| 25% Glutaraldehyde | 28.5 g | 0.91% |

triple network cooling hydrogel crosslinked with 28° C./32° C./37° C./42° C./52° C. PCM capsule particles was analyzed by differential scanning calorimetry (DSC) using a TA Instruments Q20. Results are depicted in FIG. 4.

The curve in the bottom of FIG. 4 demonstrates the endothermic process with the five peaks of phase change melting at 27.74° C./35.08° C./39.49° C./43.30° C./51.85° C., responding with the composite phase change capsule at the phase change temperature of 28° C./32° C./37° C./42° C./52° C.

Example 5: Scanning Electron Microscopy of a Triple Network Cooling Hydrogel Crosslinked with 28° C./32° C. PCM Capsule Particles

TABLE 12

| Specimen formula | | |
|---|---|---|
| Component | Weight | % by Weight (total 188.5 g) |
| PVA 1799 | 12 g | 6.4% |
| water | 50 g(PVA solution) + 60 g(PCM emulsion) | 58% |
| PCM 28 particle | 20 g | Total PCM: 21% |
| PCM 32 particle | 20 g | |
| PDMS Dow Corning 184(10:1) | 11 g (10:1) | 5.8% |
| 25% Glutaraldehyde | 7.5 g | 0.99% |
| 16% Vanillic acid | 8 g | 0.68% |

FIGS. 5A-C depict scanning electron microscopy (SEM) of triple network cooling hydrogel crosslinked with 28° C./32° C. PCM capsule particles, using a Hitachi S4700 scanning electron microscope. FIGS. 5A-C demonstrate the crosslink microstructure. The microspheres in FIG. 5A with size of 7-8 μm are the solidified PDMS microspheres, and the microspheres in FIG. 5A with the size of 2-3 μm are the phase change capsules. FIG. 5B-C demonstrate that phase change capsules microspheres take a greater proportion in the hydrogel system.

Example 6: Tensile Strength and Compression Tests on Triple Network Cooling Hydrogel Crosslinked with 28° C./32° C./37° C./42° C./52° C. PCM Capsule Particles Tensile strength and compression tests were performed on triple network cooling hydrogel crosslinked with 28° C./32° C./37° C./42° C./52° C. PCM capsule particles (Table 13) and on commercial normal hydrogel (PVA 1799 crosslinked with glutaraldehyde, without PDMS or PCM) obtained from Shanghai Chuangshi Medical technology (Group) Co., Ltd.

TABLE 13

| Hydrogel specimen formula: | | |
|---|---|---|
| Component | weight | % by Weight (total 780 g) |
| PVA 1799 | 50 g | 6.4% |
| water | 222.5 g(PVA solution) + 240 g (in PCM emulsion) | 59% |
| PCM 52 particle | 30 g | Total PCM 19% |
| PCM 42 particle | 30 g | |
| PCM 37 particle | 30 g | |
| PCM 32 particle | 30 g | |
| PCM 28 particle | 30 g | |
| PDMS Dow Corning 184(10:1) | 44 g (10:1) | 5.6% |
| 16% Vanillic acid | 45 g | 0.92% |
| 25% Glutaraldehyde | 28.5 g | 0.91% |

A. Tensile Strength Test

Tensile strength of a triple network cooling hydrogel of formula as in Table 13 was measured in a ASTM D 5035 test and compared to that of a Normal hydrogel (PVA 1799 crosslinked with glutaraldehyde, without PDMS or PCM, water content about 80-85%; obtained from Shanghai Chuangshi Medical technology (Group) Co., Ltd.).

Specifications:

Test equipment: Instron

Test method: ASTM D 5035

Thickness: 5 mm

Length: 100 cm

In the tensile strength test, loads (measured in N) on the hydrogel were varied and extension of the hydrogel measured (mm). FIG. 6 depicts results of tensile strength test, showing test images (2$^{nd}$ column), test graph (3$^{rd}$ column), maximum load (4$^{th}$ column), and extension at maximum load (5$^{th}$ column). The triple network cooling hydrogel showed 6 times more tensile strength than the normal hydrogel (33.73 N for the triple network cooling hydrogel vs. 5.62N for the normal hydrogel). The triple network cooling hydrogel showed 25 times more elongation at maximum load at tensile break than the normal hydrogel (129 mm for the triple network cooling hydrogel vs. 5.02 mm for the normal hydrogel).

B. Compression Test

Compression of a triple network cooling hydrogel of formula as in Table 13 was measured in a ISO 3386-1 test and compared to that of a Normal hydrogel: (PVA 1799 crosslinked with glutaraldehyde, without PDMS or PCM, water content about 80-85%; obtained from Shanghai Chuangshi Medical technology (Group) Co., Ltd.).

Specifications

Test equipment: Instron

Test method: ISO 3386-1

Thickness: 25 mm

In the compression test, loads (measured in N) on the hydrogel were varied and extension of the hydrogel measured (mm). FIG. 7 depicts results of compression test, showing test images (2$^{nd}$ column), test graph (3$^{rd}$ column), load (N) at extension 17 mm (4$^{th}$ column), and shape stability (5$^{th}$ column). The triple network cooling hydrogel is 10 times as compressive at extension 17 mm than the normal hydrogel (2850N for the triple network cooling hydrogel vs. 285N for the normal hydrogel). The triple network cooling hydrogel recovered to original shape 100% after compression of 2850N, with the diameter kept as original 8.3 cm, while the normal hydrogel deformed after the compression of 285N, with the diameter deformed from 8.0 cm to 13.3 cm.

Example 7: Cooling Period Tests

As a measure of cooling period, hydrogels were exposed to simulated solar radiation and temperature measured.

Specifications:

Test equipment: ATLAS Ci3000+ Xenon Weather Ometer; MSR 147WD series Data Loggers and Recorders.

Test conditions: Environment Temperature: 37° C.±3° C. simulated solar radiation irradiance: 1120±47 W/m 2 (maximum irradiance at noon all over the world—GJB150.7a)

Exposure cycle duration: 60 min exposure+30 min dark

Test Method: Pack and seal the same weight (100 g) of normal hydrogel and triple network cooling hydrogel with the same reflective film, expose the sealed padding in the Xenon weather ometer chamber at the same radiation and the same cycle duration.

Figure 8A:
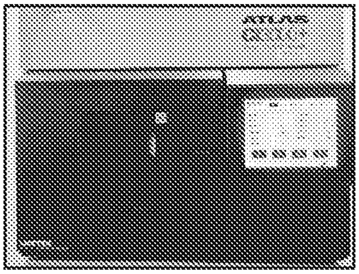
FIGS. 8A-8E depict results of experiments measuring hydrogel temperature when exposed to simulated solar radiation.
Figure 8B:
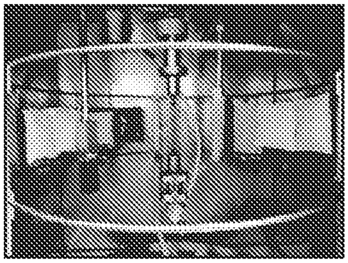
Figure 8C:
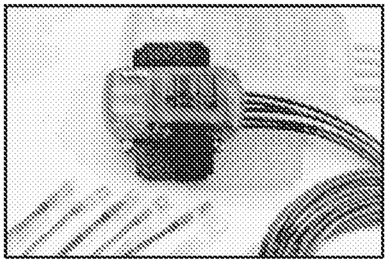

FIGS. 8A-C shows the equipment used in/for the tests: exterior of the ATLAS Ci3000+ Xenon Weather Ometer (FIG. 8A, left), chamber of the ATLAS Ci3000+ Xenon Weather Ometer (FIG. 8B, center), and MSR 147WD to record the real time temperature of the hydrogel padding (FIG. 8C, right).

A. Temperature Change of Hydrogel with or without PCM Under Solar Radiation.

Figure 8D:
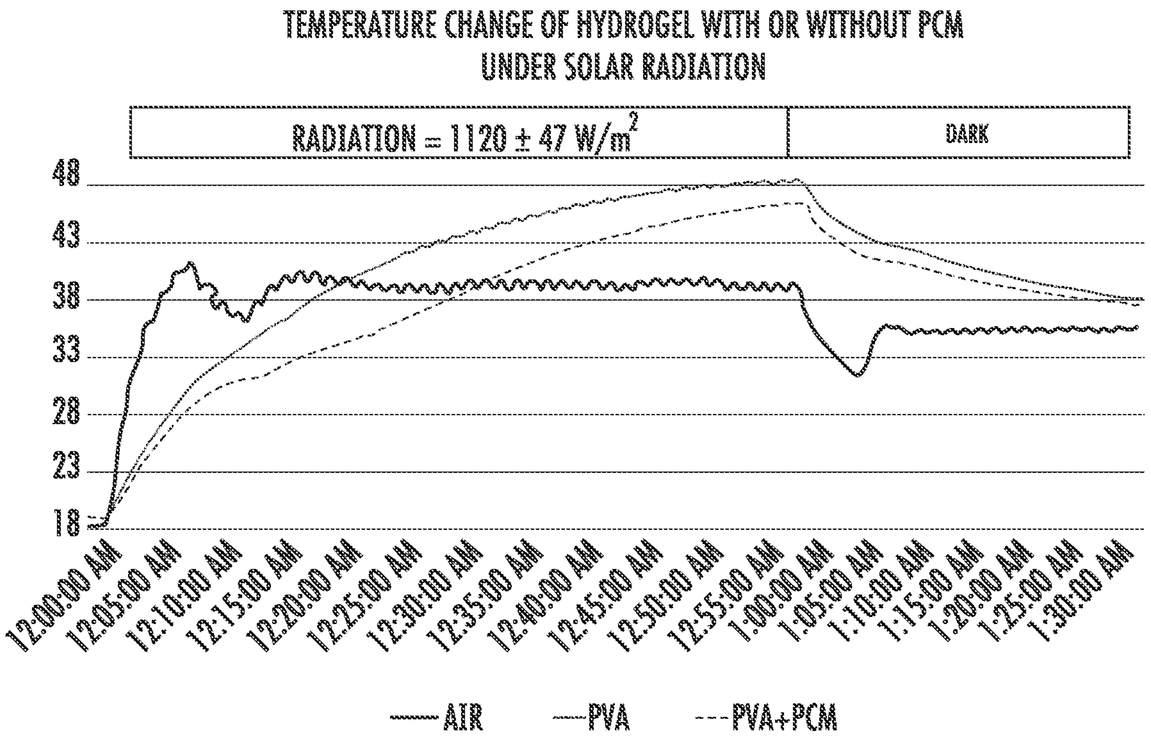

A PVA/PCM hydrogel (dashed curve) was compared to a PVA hydrogel [no PCM] (dotted curve) in FIG. 8D. Air is depicted in solid curve.

TABLE 14

| Dashed curve formula: PVA/PCM-28 hydrogel | |
|---|---|
| Component | weight |
| PVA 1799 | 12 g |
| PCM 28 particle | 83 g |
| water | 200 g |
| 25% glutaraldehyde | 20 g |

TABLE 15

| Dotted curve formula: PVA hydrogel [No PCM] | |
|---|---|
| Component | weight |
| PVA 1799 | 12 g |
| water | 200 g |
| 25% glutaraldehyde | 13 g |

Conclusion

The formula with PCM 28° C. hydrogel has a lower temperature during the 1 hour radiation than the formula without PCM hydrogel. The maximum temperature difference is around 6° C. at 25 minutes. The PCM in the formula in Table 14 (dashed curve) gives the hydrogel better cooling function than the formula that does not contain PCM (formula in Table 15, dotted curve).

B. Temperature Change of Hydrogel with Different Formula (0302, 0303, and 0224C) Under Solar Radiation.

Figure 8E:
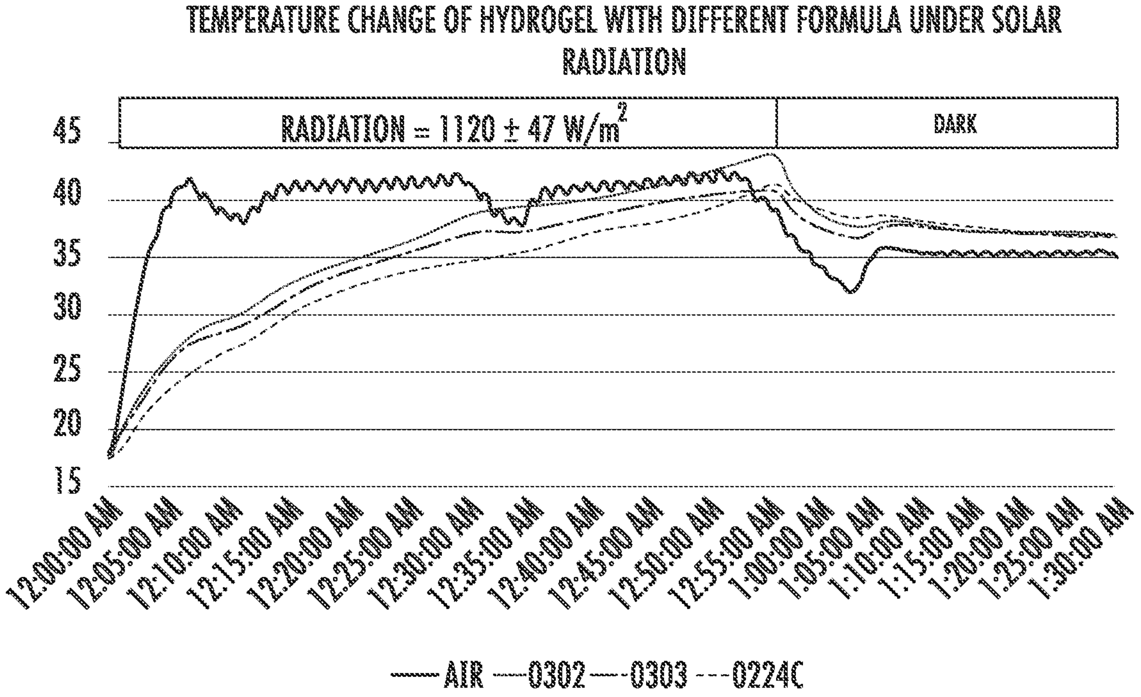

Three hydrogels were compared in FIG. 8E: a PVA/PDMS/PCM-42, 45, 32, 37, 28, 52, hydrogel (0224C formula, dashed curve), a PVA/PDMS/PCM-32, 37 hydrogel (0303 formula, dot-dashed curve), and a PVA/PDMS [no PCM] (0302 formula, dotted curve). Air is depicted in solid curve.

TABLE 16

| 0224C curve formula | | |
|---|---|---|
| Component | weight | % by Weight (total 804.5 g) |
| PVA 1799 | 50 g | 6.2% |
| water | 462.5 g | 57% |
| PCM 42 particle | 30 g | Total PCM 22% |
| PCM 45 particle | 30 g | |
| PCM 32 particle | 30 g | |
| PCM 37 particle | 30 g | |
| PCM 28 particle | 30 g | |
| PCM 52 particle | 30 g | |
| PDMS Dow Corning 184(10:1) | 44 g (10:1) | 5.5% |
| 25% glutaraldehyde | 68 g | 2.1% |

TABLE 17

| 0303curve formula | | |
|---|---|---|
| Component | weight | % by Weight (total 223 g) |
| PVA 1799 | 15 g | 6.7% |
| water | 142 g | 64% |
| PCM 32 particle | 20 g | Total PCM 18% |
| PCM 37 particle | 20 g | |
| PDMS Dow Corning 184(10:1) | 11 g (10:1) | 4.9% |
| 25% glutaraldehyde | 15 g | 1.7% |

TABLE 18

| 0302curve formula | |
|---|---|
| Component | weight |
| PVA 1799 | 15 g |
| water | 142 g |
| Dow Corning 184(10:1) | 11 g |
| 25% glutaraldehyde | 10 g |

Conclusion

Formula 0224C with PCM 42/45/32/37/28/52° C. hydrogel (Table 16; dashed curve) has a lower temperature during the 1 hour radiation than either the 0302 formula with no PCM (Table 18, dotted curve) and the 0303 formula with PCM-32, 37 hydrogel (Table 17; dot-dashed curve). The maximum temperature difference is around 4° C. at 35 minutes between formulas 0224C and 0302. Comparing the 0224C and 0303 formulas, the multi-component formula with a wider range of phase change capsules and higher proportion PCM (0224C formula) has the better cooling performance. The triple network cooling hydrogel (0224C formula) compared with 0302 formula without PCM in the system has significant temperature difference during the 1 hour radiation period.

What is claimed is:

1. A triple crosslinked cooling hydrogel composition comprising about 4-8% w/w polyvinyl alcohol (PVA), about 4-8% w/w polydimethylsiloxane (PDMS), about 15-25% w/w phase change material (PCM), about 55-68% w/w water, and about 0.5-2.5% w/w crosslinker.

2. The triple crosslinked cooling hydrogel composition of claim 1, wherein the PVA is PVA 1799.

3. The triple crosslinked cooling hydrogel composition of claim 1, wherein the crosslinker is glutaraldehyde.

4. The triple crosslinked cooling hydrogel composition of claim 1, wherein the PCM is/comprises at least one of PCM 28, PCM 32, PCM 37, PCM 42, PCM 45, and PCM 52.

5. The triple crosslinked cooling hydrogel composition of claim 1, wherein the PCM comprises at least two of PCM 28, PCM 32, PCM 37, PCM 42, PCM 45, and PCM 52.

6. The triple crosslinked cooling hydrogel composition of claim 1, wherein the PCM comprises at least three of PCM 28, PCM 32, PCM 37, PCM 42, PCM 45, and PCM 52.

7. The triple crosslinked cooling hydrogel composition of claim 1, wherein the PCM comprises at least four of PCM 28, PCM 32, PCM 37, PCM 42, PCM 45, and PCM 52.

8. The triple crosslinked cooling hydrogel composition of claim 1, wherein the PCM comprises at least five of PCM 28, PCM 32, PCM 37, PCM 42, PCM 45, and PCM 52.

9. The triple crosslinked cooling hydrogel composition of claim 1, wherein the PCM comprises PCM 28, PCM 32, PCM 37, PCM 42, PCM 45, and PCM 52.

10. The triple crosslinked cooling hydrogel composition of claim 1, further comprising vanillic acid.

11. The triple crosslinked cooling hydrogel composition of claim 2, comprising about 6.1% w/w PVA 1799, about 57% w/w water, about 22% w/w PCM, about 5.4% w/w PDMS, about 0.87% w/w glutaraldehyde, and about 0.89% w/w vanillic acid;

about 6.4% w/w PVA 1799, about 58% w/w water, about 21% w/w PCM, about 5.8% w/w PDMS, about 0.99% w/w glutaraldehyde, and about 0.68% w/w vanillic acid;

about 4.8% w/w PVA 1799, about 63% w/w water, about 19% w/w PCM, about 5.3% w/w PDMS, about 0.72% w/w glutaraldehyde, and about 0.85% w/w vanillic acid;

about 6.4% w/w PVA 1799, about 59% w/w water, about 19% w/w PCM, about 5.6% w/w PDMS, about 0.91% w/w glutaraldehyde, and about 0.92% w/w vanillic acid;

about 6.2% w/w PVA 1799, about 57% w/w water, about 22% w/w PCM, about 5.5% w/w PDMS, and about 2.1% w/w glutaraldehyde; or about 6.7% w/w PVA 1799, about 64% w/w water, about 18% w/w PCM, about 4.9% w/w PDMS, and about 1.7% w/w glutaraldehyde.

12. A method for making a triple crosslinked cooling hydrogel of claim 1, comprising (a) adding PVA to water at about 95° C. and performing stirring to produce a first crosslinked single network PVA hydrogel;

(b) adding PDMS and a first curing agent to the first crosslinked single network PVA hydrogel at about 30° C. and performing stirring, to produce a double network PVA+PDMS hydrogel;

(c) increasing the temperature of the double network PVA+PDMS hydrogel to about 95° C. at the rate of about 2° C./minute and performing stirring to produce a double network PVA+solidified PDMS hydrogel;

(d) decreasing the temperature of the double network PVA+solidified PDMS hydrogel to about 85° C. and adding PCM while stirring to produce a triple network PVA+PDMS+PCM hydrogel;

(e) adding a crosslinking agent to the triple network PVA+PDMS+PCM hydrogel at about 85° C. to produce a stable triple network PVA+PDMS+PCM hydrogel; and (f) cooling the stable triple network PVA+PDMS+PCM hydrogel to room temperature to produce the triple network cooling hydrogel.

13. The method of claim 12, wherein the PCM is a PCM particle emulsion prepared by mixing PCM microcapsules and water.

14. The method of claim 12, further comprising adding a second curing agent to the triple network PVA+PDMS+PCM hydrogel in step (e).

15. The method of claim 14, wherein the second curing agent is vanillic acid.

16. The method of claim 12, wherein the PVA is PVA 1799.

17. The method of claim 12, wherein the first curing agent is pre-mixed with the PDMS.

18. The method of claim 12, wherein the crosslinking agent is glutaraldehyde.

19. The method of claim 12, wherein the PCM is/comprises at least one of PCM 28, PCM 32, PCM 37, PCM 42, PCM 45, and PCM 52;

the PCM comprises at least two of PCM 28, PCM 32, PCM 37, PCM 42, PCM 45, and PCM 52;

the PCM comprises at least three of PCM 28, PCM 32, PCM 37, PCM 42, PCM 45, and PCM 52;

the PCM comprises at least four of PCM 28, PCM 32, PCM 37, PCM 42, PCM 45, and PCM 52;

the PCM comprises at least five of PCM 28, PCM 32, PCM 37, PCM 42, PCM 45, and PCM 52; or the PCM comprises PCM 28, PCM 32, PCM 37, PCM 42, PCM 45, and PCM 52.

20. An article of clothing comprising the triple network cooling hydrogel of claim 1.

21. The triple crosslinked cooling hydrogel composition of claim 1 further comprising:

a first crosslinked single network PVA hydrogel, wherein molecular chains of the PVA are crosslinked by hydrogen bonds;

a double network PVA+PDMS hydrogel, wherein microspheres of the PDMS are crosslinked with long chain molecules of the PVA by van der Waals interactions; and a triple network PVA+PDMS+PCM hydrogel, wherein capsule particles of the PCM are embedded into the double network PVA+PDMS hydrogel and act as a third crosslinking agent.

* * * * *